United States Patent [19]
Hill

[11] Patent Number: 5,526,507
[45] Date of Patent: Jun. 11, 1996

[54] COMPUTER MEMORY ARRAY CONTROL FOR ACCESSING DIFFERENT MEMORY BANKS SIMULLANEOUSLY

[76] Inventor: Andrew J. W. Hill, 3 Thomson Walk, Calcot Heights, Reading, RG3, United Kingdom

[21] Appl. No.: 988,831

[22] Filed: Dec. 10, 1992

Related U.S. Application Data

[63] Continuation-in-part of Ser. No. 934,916, Aug. 25, 1992, abandoned.

[30] Foreign Application Priority Data

Jan. 6, 1992 [GB] United Kingdom ............... 9200207

[51] Int. Cl.⁶ ..................... G06F 11/10; G06F 13/16
[52] U.S. Cl. ............ 395/441; 395/182.04; 364/DIG. 1; 364/268.9; 364/DIG. 2; 364/944.61; 364/945.6; 364/952.1; 364/966.5
[58] Field of Search .................. 371/10.1; 395/425, 395/575, 441, 182.04

[56] References Cited

U.S. PATENT DOCUMENTS

| | | | |
|---|---|---|---|
| 4,509,119 | 4/1985 | Gumaer et al. | 395/250 |
| 5,148,432 | 9/1992 | Gordon et al. | 371/10.1 |
| 5,187,778 | 2/1993 | Yamamoto et al. | 295/250 |
| 5,301,297 | 4/1994 | Menon et al. | 395/425 |
| 5,303,244 | 4/1994 | Watson | 371/10.1 |

OTHER PUBLICATIONS

"Raid Aid: A Taxonomic Extension of the Berkeley Disk Array Schema"; Storage Computer Corporation; 1991; pp. 1-4.

*Primary Examiner*—Eddie F. Chan
*Assistant Examiner*—Reginald G. Bragdon
*Attorney, Agent, or Firm*—Wolf, Greenfield & Sacks

[57] ABSTRACT

A computer memory controller for interfacing to a host computer comprises a buffer memory for interfacing to a plurality of memory units and for holding data read thereto and therefrom. A central controller is operative to control the transfer of data to and from the host computer and the memory units. The buffer memory is controlled to form a plurality of buffer segments for addressably storing data read from or written to the memory units. The central controller is operative to allocate a buffer segment for a read or write request from the host computer, of a size sufficient for the data. The central controller is also operative in response to data requests from the host computer to control the memory units to seek a plurality of requested data stored in different memory units simultaneously.

39 Claims, 27 Drawing Sheets

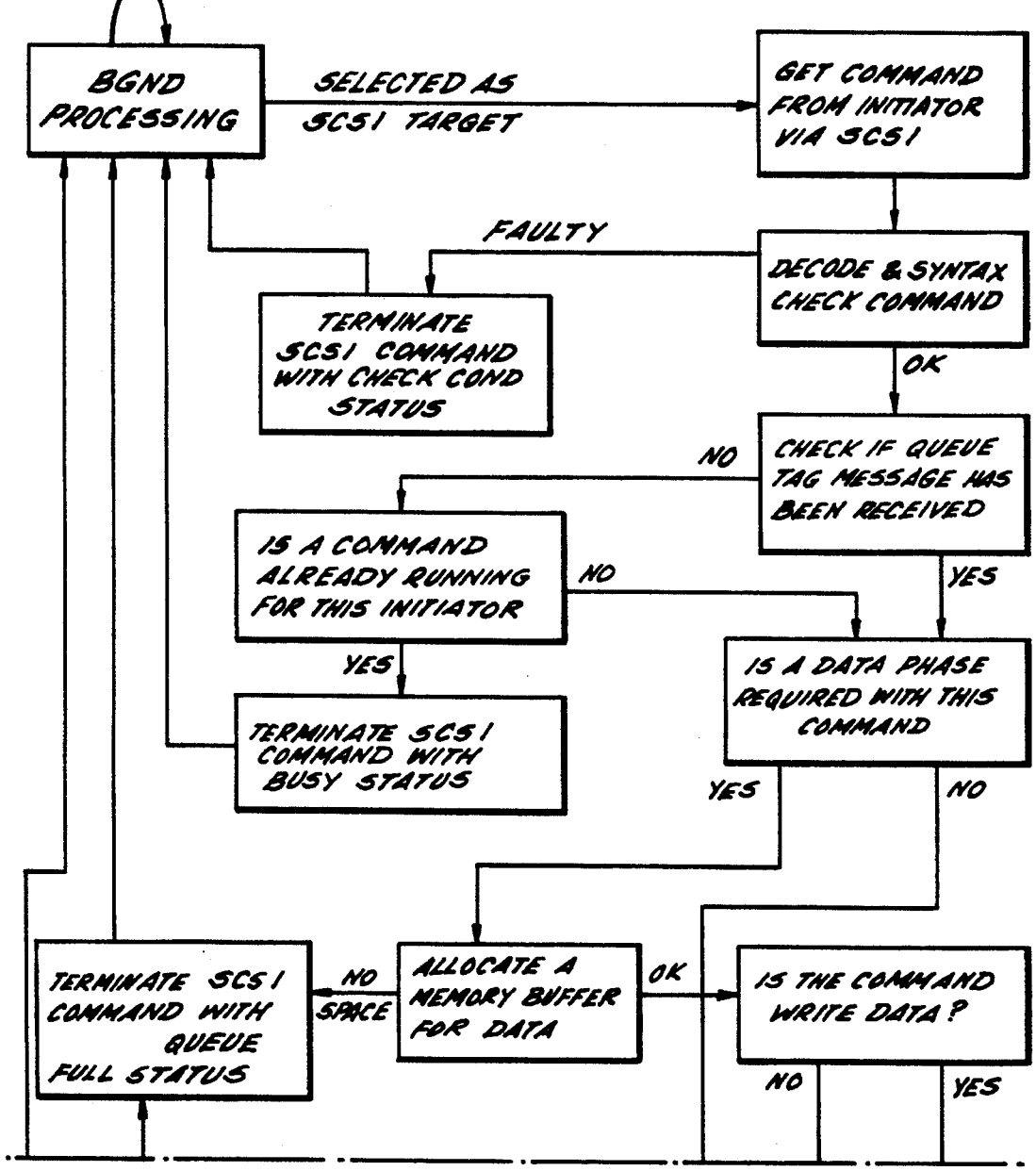

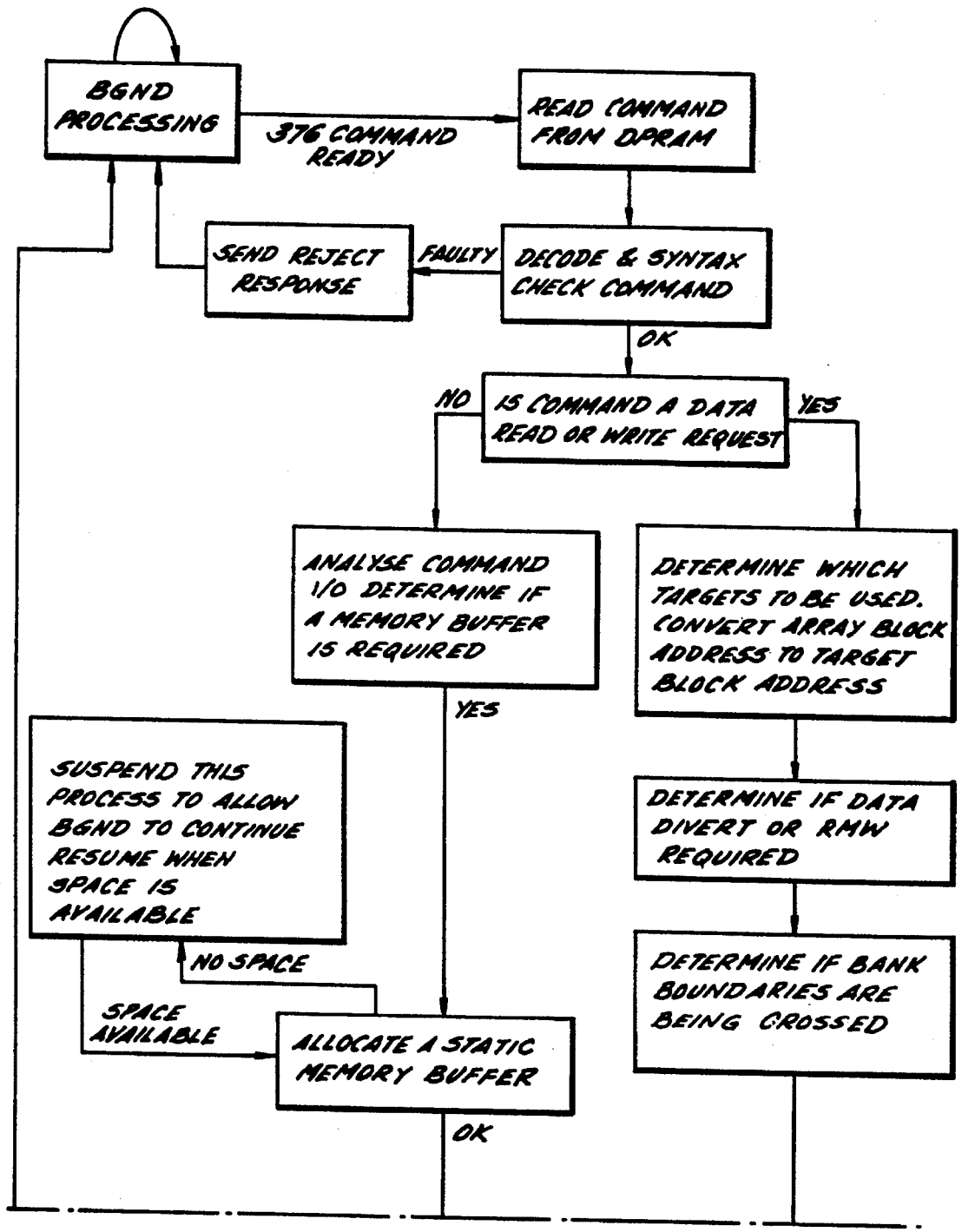

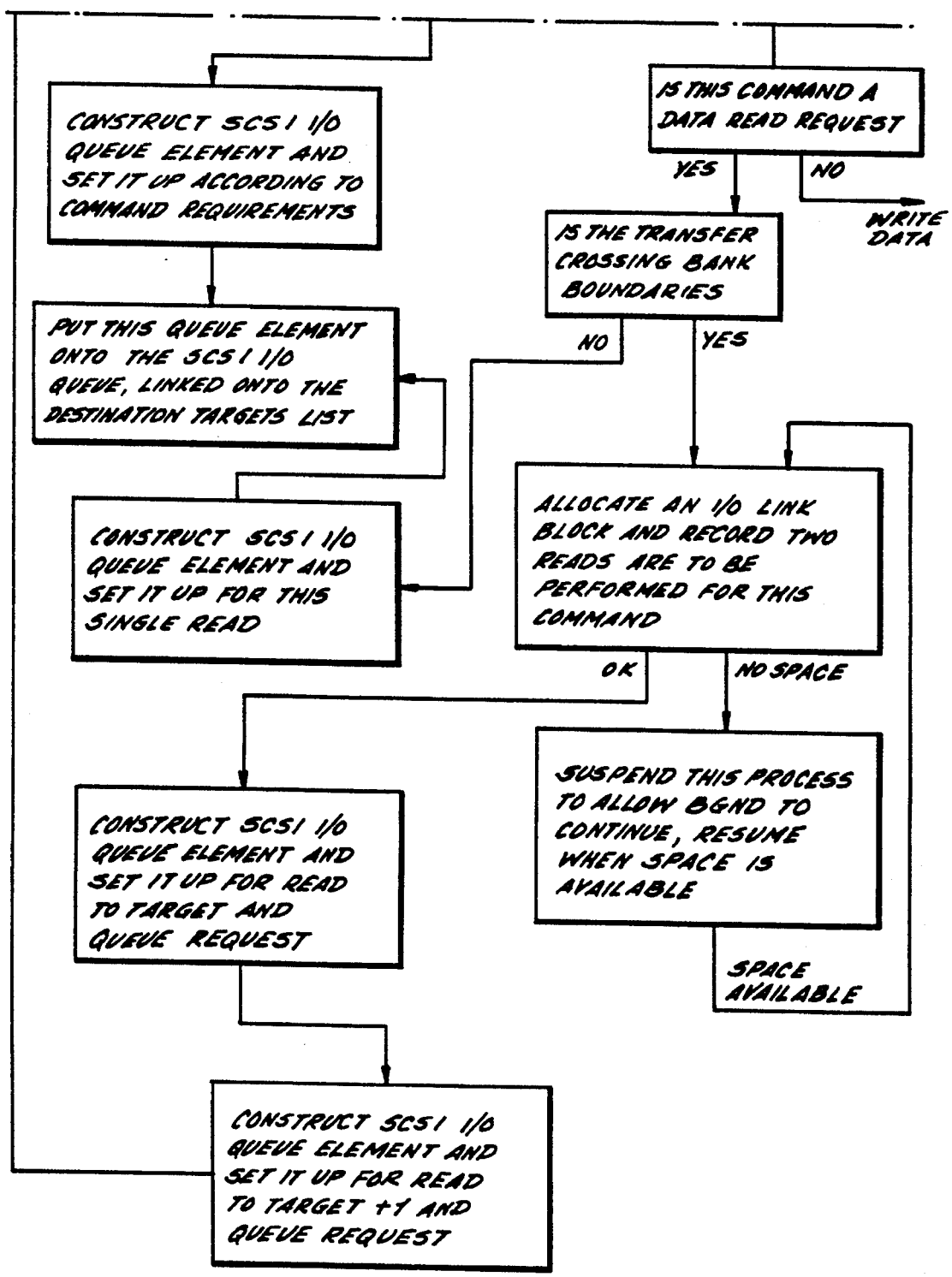
FIG. 16a2

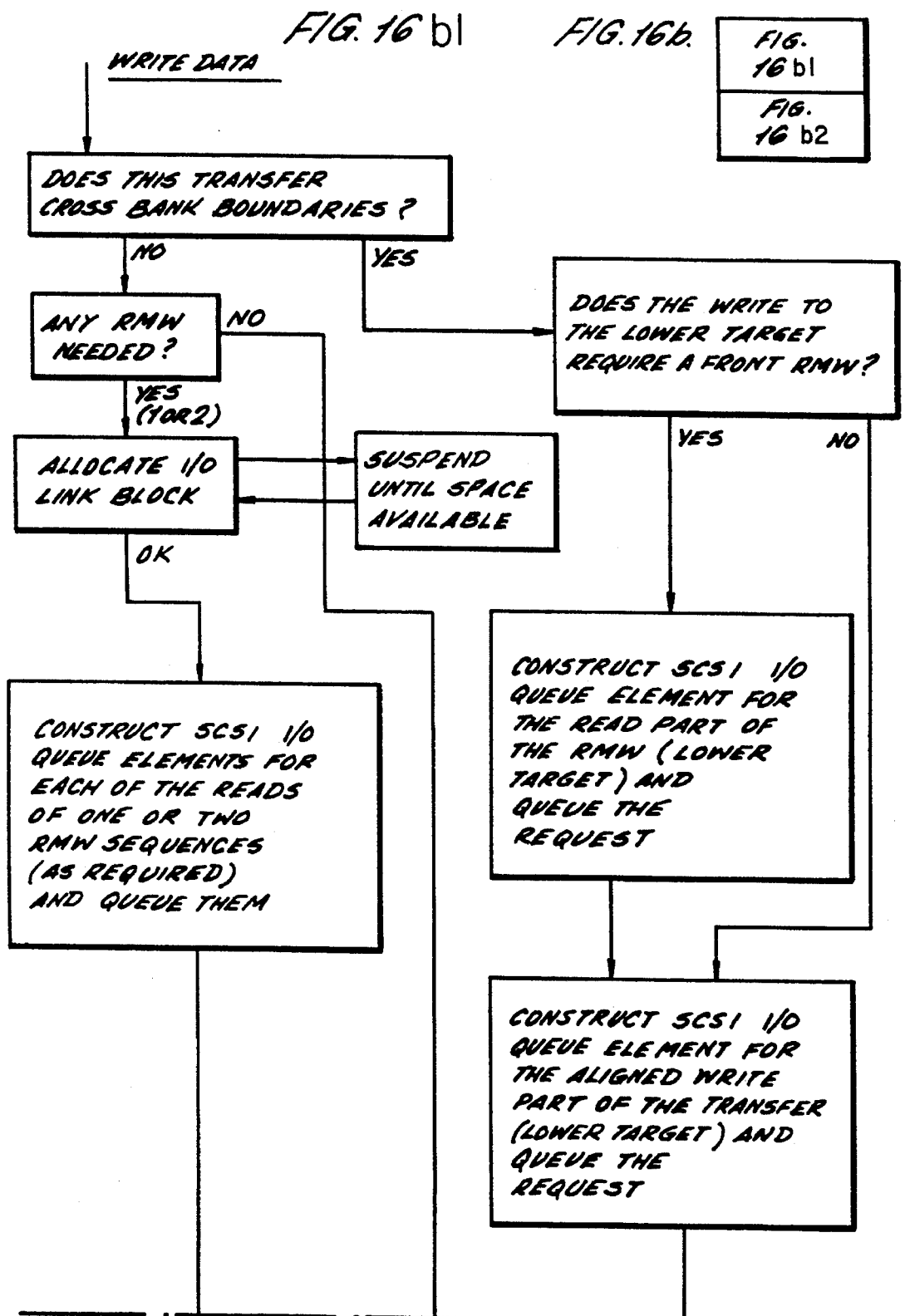

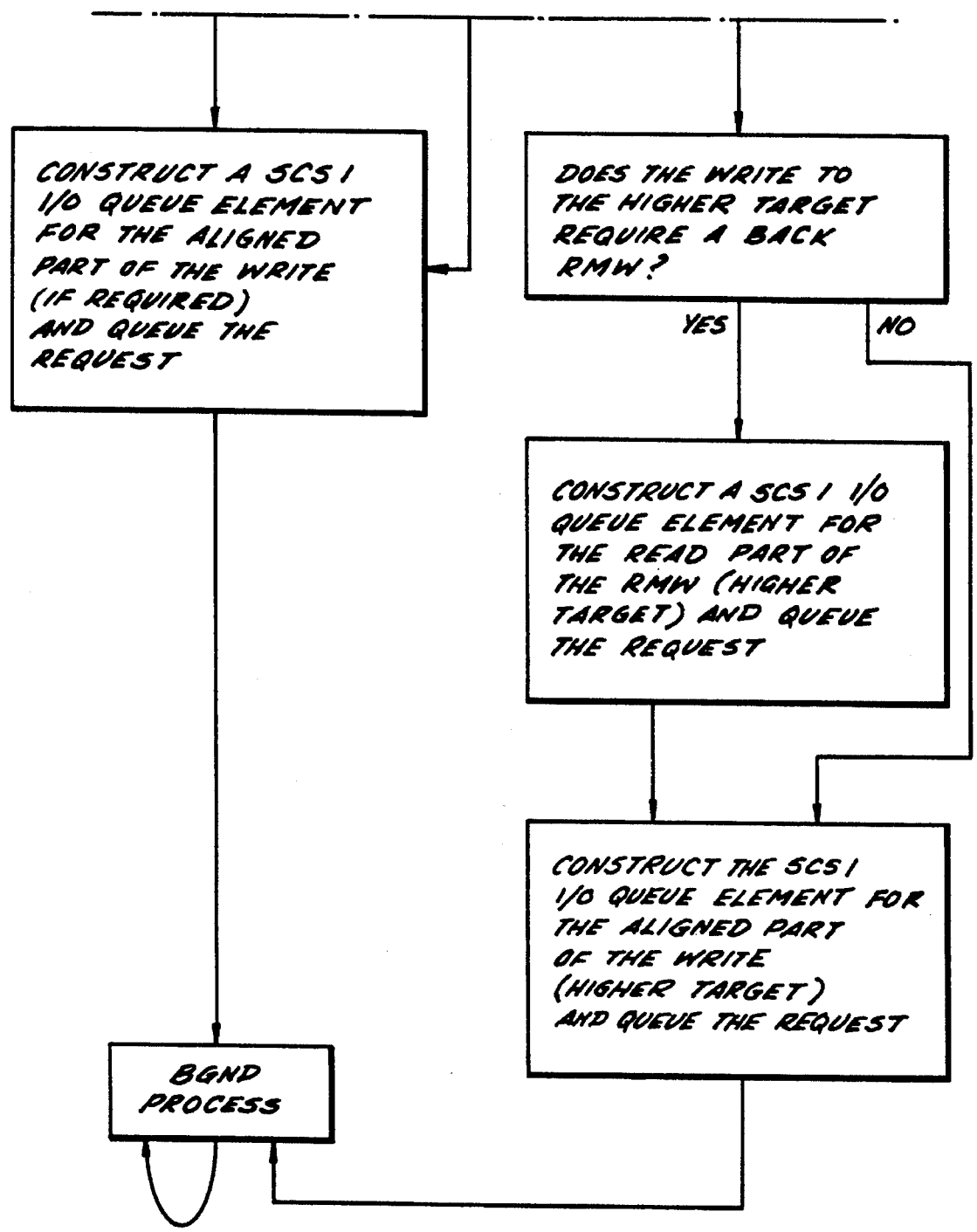
FIG. 16 b2

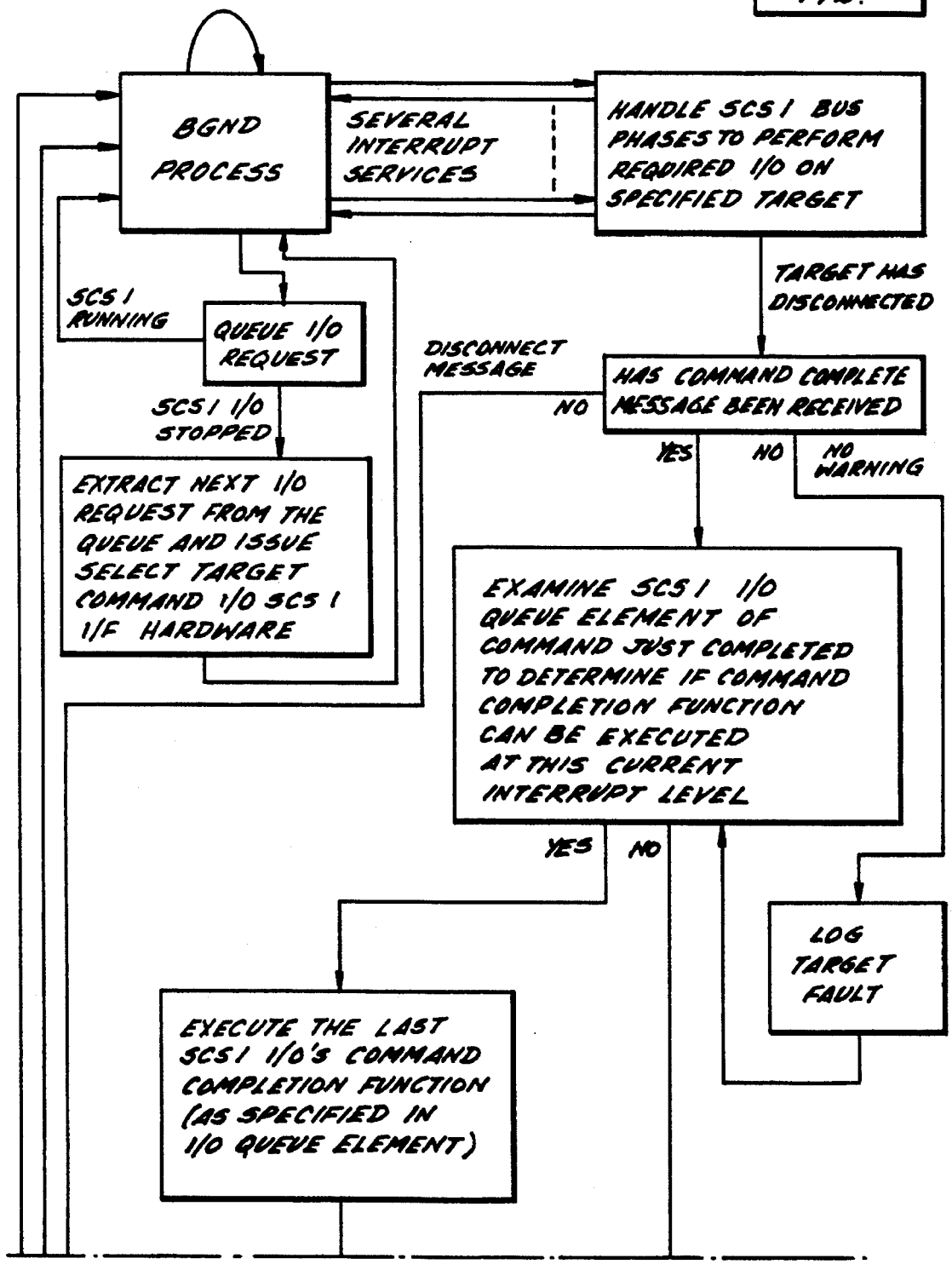

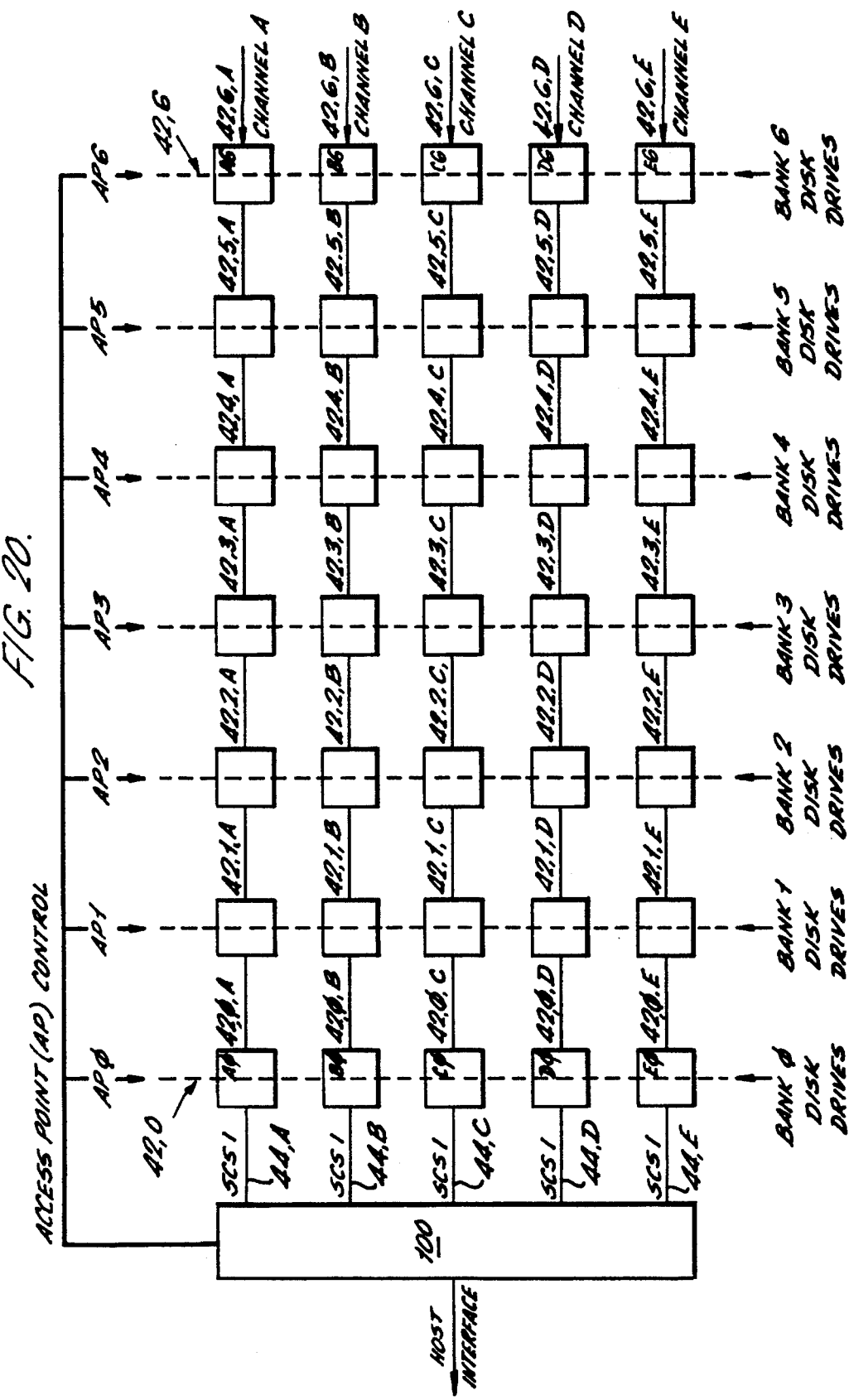

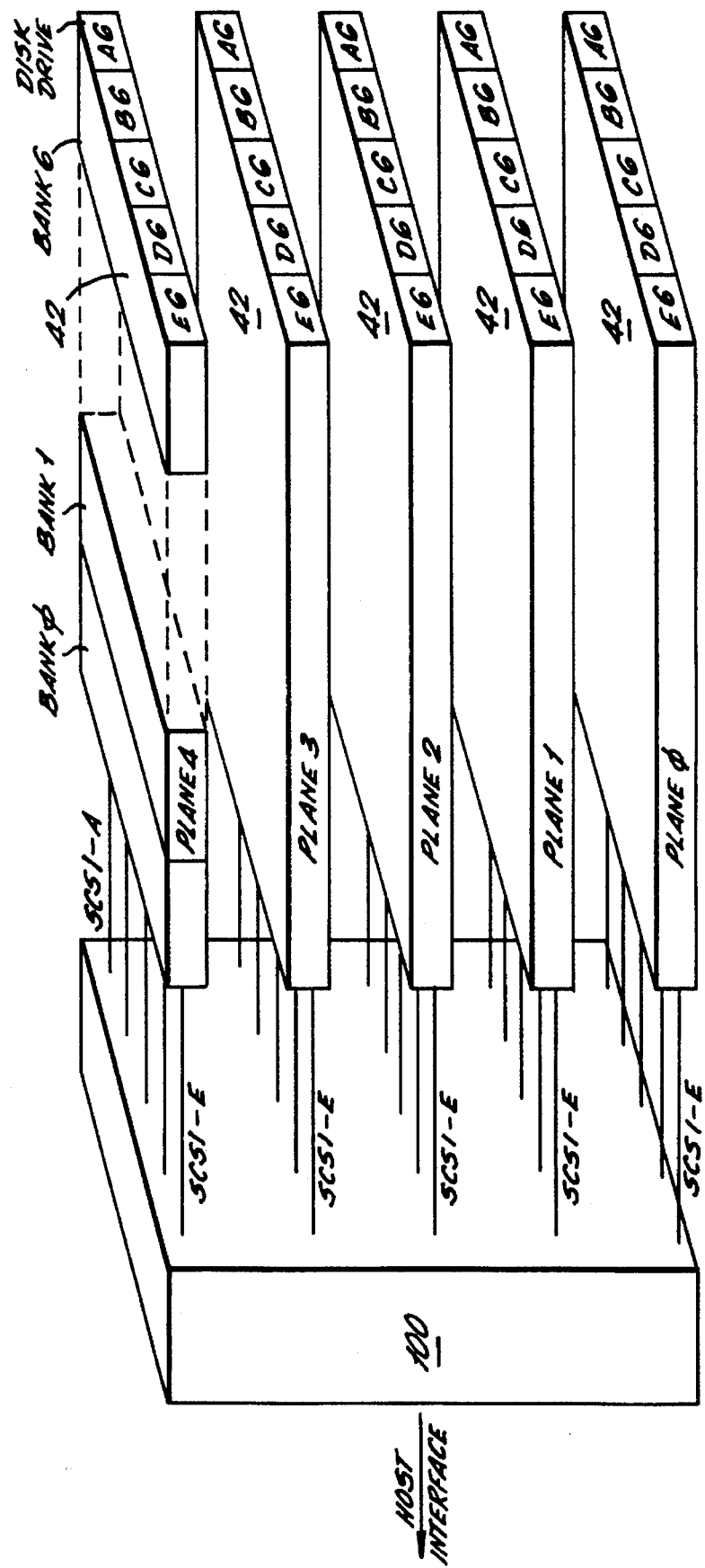

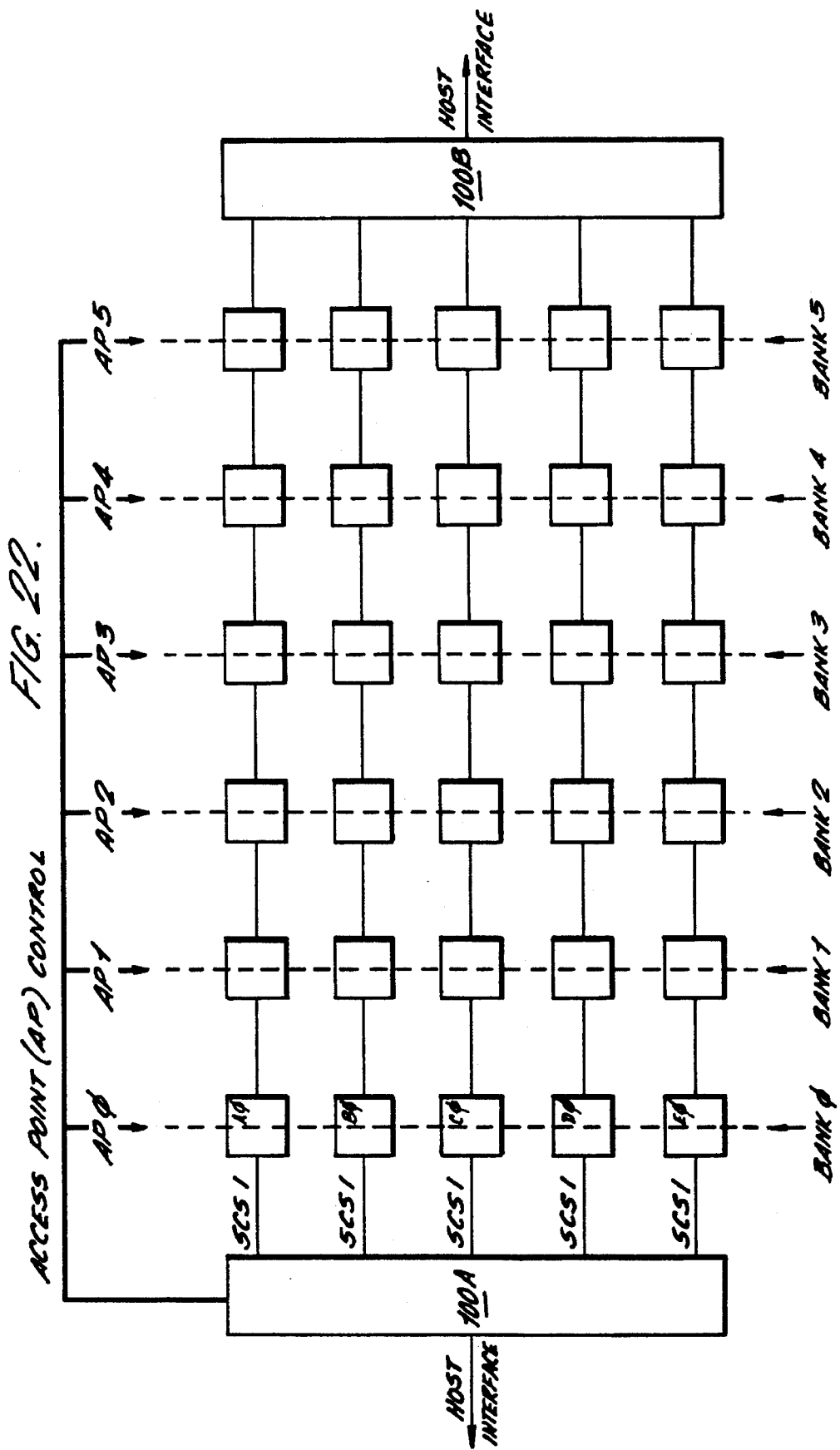

COMPUTER MEMORY ARRAY CONTROL FOR ACCESSING DIFFERENT MEMORY BANKS SIMULLANEOUSLY

RELATED APPLICATION DATA

This patent application is a continuation-in-part of U.S. patent application Ser. No. 07/934,916 filed on 25th Aug. 1992, now abandoned, which application is based on United Kingdom Patent Application No. 9200207.0 filed in the United Kingdom on 6th Jan. 1992. Each of these applications is entirely incorporated herein by reference.

BACKGROUND OF THE INVENTION

1. Field of the Invention

This invention relates to computer memories, and in particular to a controller for controlling and a method of controlling an array of memory units in a computer.

2. Description of the Prior Art

For high performance Operating Systems and Fileservers, an idealistic computer memory would be a memory having no requirement to "seek" the data. Such a memory would have instantaneous access to all data areas. Such a memory could be provided by a RAM disk. This would provide for access to data regardless of whether it was sequential or random in its distribution in the memory. However, the use of random access memory RAM is disadvantageous compared to the use of conventional magnetic disk drive storage media in view of the high cost of RAM and especially due to the additional high cost of providing "redundancy" to compensate for failure of memory units.

Thus the most commonly used non-volatile computer memories are magnetic disk drives. However, these disk drives suffer from the disadvantage that they require a period of time to position the head or heads with the correct part of the disk corresponding to the location of the data. This is termed the seek and rotation delay. This delay becomes a significant portion of the data access time when only a small amount of data is to be read or written to or from the disk.

For disk drives, the seek and rotational latency times can considerably limit the operating speed of a computer. The input/output (I/O) speed of disk drives has not kept pace with the development of microprocessors and therefore memory access time can severely restrain the performance of modern computers.

In order to reduce the data access time for a large memory, a number of industry standard relativity inexpensive disk drives have been used. Since a large array of these is used, some redundancy must be incorporated in the array to compensate for disk drive failure.

It is known to provide disk drives in an array of drives in such a way that the contents of any one drive can, should that drive fail, be reconstructed in a replacement drive from the information stored in the other drives.

Various classifications of arrangements that can perform this are described in more detail in a paper by D. A. Patterson, G. Gibson and R. H. Katz under the title "A Case for Redundant Arrays of Inexpensive Disks (RAID)", Report No. UCB/CSD 87/391 12/1987, Computer Science Division, University of California, U.S.A., the content of which is incorporated herein by reference.

This document describes two types of arrangements. The first of these arrangements is particularly adapted for large scale data transfers and is termed "RAID-3". In this arrangement at least three disk drives are provided in which sequential bytes of information are stored in the same logical block positions on the drives, one drive having a check byte created by a controller written thereto, which enables any one of the other bytes on the disk drives to be determined from the check byte and the other bytes. The term "RAID-3" as used hereinafter is as defined by the foregoing passage.

In the RAID-3 arrangement there is preferably at least five disk drives, with four bytes being written to the first four drives and the check byte being written to the fifth drive, in the same logical block position as the data bytes on the other drives. Thus, if any drive fails, each byte stored on it can be reconstructed by reading the other drives. Not only can the computer be arranged to continue to operate despite failure of a disk drive, but also the failed disk drive can be replaced and rebuilt without the need to restore its contents from probably out-of-date backup copies. Moreover, even if one drive should fail, there is no loss of performance of the computer while the failed disk drive remains inactive and while it is replaced. A disk drive storage system having the RAID-3 arrangement is described in EP-A-0320107, the content of which is incorporated herein by reference.

The second type of storage system which is particularly adapted for multi-user applications, is termed "RAID-5". In the RAID-5 arrangement there are preferably at least five disk drives in which four sectors of each disk drive are arranged to store data and one sector stores check information. The check information is derived not from the data in the four sectors on the disk, but from designated sectors on each of the other four disks. Consequently each disk can be rebuilt from the data and check information on the remaining disks.

RAID-5 is seen to be advantageous, at least in theory, because it allows multi-user access, albeit with equivalent transfer performance of a single disk drive.

However, a write of one sector of information involves writing to two disks, that is to say writing the information to one sector on one disk drive and writing check information to a check sector on a second disk drive. However, writing the check sector is a read modify write operation, that is, a read of the existing data and check sectors first, because the old contents of those sectors must be known before the correct check information, based on the new data to be written, can be generated and written to disk. Nevertheless, RAID-5 does allow simultaneous reads by multiple users from all disks in the system which RAID-3 cannot support.

On the other hand, RAID-5 cannot match the rate of data transfer achievable with RAID-3, because with RAID-3, both read and write operations involve a transfer to each of the five disks (in five disk systems) of only a quarter of the total amount of information transferred. Since each referral can be accomplished simultaneously the process is much faster than reading or writing to a single disk particularly where large scale transfers are involved. This is because most of the time taken to effect a read or write in respect of a given disk drive, is the time taken for the read/write heads to be positioned with respect to the disk, and for the disk to rotate to the correct angular position. Clearly, this is as long for one disk, as it is for all four. But once in the correct position, transfers of large amounts of sequential information can be effected relatively quickly.

Moreover, with the current trend for sequential information to be requested by the user, RAID-5 only offers multiple user access in theory, rather than in practice, because requests for sequential information by the same user may involve reading several disks in turn, thereby occupying those disks so that they are not available to other users.

Furthermore, when a drive fails in RAID-5 format, the performance of the computer is severely retarded. When reading, if the required information is on a sector in the failed drive, it must be derived by reading all four of the other disks. Similarly, when writing either check or information data to a working drive, the four working disks must first be read before the appropriate information sector is written and before the appropriate check information is determined and written.

A further problem with RAID-3 is that disk drives are presently made to read or write minimum amounts of information on each given occasion. This is the formatted sector size of the disk drive and there is usually a minimum of 256 Bytes. In RAID-3 format this means that the minimum block length on any read or write is 1,024 Bytes. With growing disk drive capacities the tendency is towards even larger minimum block sizes such as 512 Bytes, so that RAID-3 effectively quadruples that minimum to 2,048 Bytes. However, many applications for computers, for example those employing UNIX version 5.3 require a minimum block size of only 512 Bytes and in this event, the known RAID-3 technique is not easily available to such systems. RAID-5 on the other hand does not increase the minimum data block size.

Nevertheless, it is the multi-user capability of RAID-5 which makes it theoretically more advantageous than RAID-3; but, in fact, it is the data transfer rate and continued performance in the event of drive failure in RAID-3 format which gives the latter much greater potential. So it is an object of the present invention to provide a system which exhibits the same multi-user capability of a RAID-5 disk array, or indeed better capability in that respect. The inventor has previously developed a system which has been termed RAID-35 and which is disclosed in the specification of PCT/GB90/01557 which is hereby incorporated by reference. This system offers the same if not better performance as RAID-3 and RAID-5. This system recognises that with modern operating systems, data files tend to be sequential in the nature of their storage on the disk drive surface and read and write operations tend to be sequential or at least partially sequential in nature. Thus even with multi-user access to a disk storage medium, each user may require some sequential data in sequential requests.

The RAID-35 system vastly reduces the delay in a host computer receiving data requested from the disk array since sequential data is read-ahead and stored in buffer segments. Thus if the requested data is sequential to a previous request then there is no seek delay, since the data is present in the buffer segment.

The RAID-35 system is thus highly efficient for applications where users are likely to request sequential data. On the other hand if the data requests are random, the advantages of the RAID-35 system cannot be realised.

It is an object of the present invention to provide a computer memory controller capable of providing a host computer with random data in a fast and efficient manner.

It is also an object of the present invention to provide a computer memory controller capable of operating the RAID-35 arrangement and capable of being interfaced to a three dimensional array memory units.

It is also an object of the present invention to provide a computer memory controller capable of operating the RAID-35 arrangement as well as providing a host computer with random data in a fast and efficient manner.

BRIEF SUMMARY OF THE INVENTION

The present invention provides a computer memory controller for interfacing to a host computer comprising a buffer means for interfacing to a plurality of memory units and for holding data read thereto and therefrom; and control means operative to control the transfer of data to and from said host computer and said memory units; said buffer means being controlled to form a plurality of buffer segments for addressably storing data read from or written to said memory units; said control means being operative to allocate a buffer segment for a read or write request from the host computer, of a size sufficient for the data; said control means being further operative in response to data requests from said host computer to control said memory units to seek data stored in different memory units simultaneously.

The present invention also provides a method of controlling a plurality of memory units for use with a host computer comprising the steps of repeatedly receiving from said host computer a read request for data stored in said memory units and allocating a buffer segment of sufficient size for the data to be read; and seeking data in said plurality of memory units simultaneously.

The present invention further provides a computer memory controller for a host computer comprising buffer means for interfacing to at least three memory channels arranged in parallel, each memory channel comprising a plurality of memory units connected by a bus such that each memory unit of said memory channel is independently accessible; respective memory units of said memory channels forming a memory bank; a logic circuit connected to said buffer means to split data input from said host computer into a plurality of portions such that said portions are temporarily stored in a buffer segment before being applied to ones of a group of said memory channels for storage in a memory bank; said logic circuit being further operative to recombine portions of data successively read from successive ones of a group of said memory units of a memory bank and into said buffer means; said logic circuit including parity means operative to generate a check byte or group of bits from said data for temporary storage in said buffer means before being stored in at least one said memory unit of said memory bank, and operative to use said check byte to regenerate said data read from said group of memory units of a memory bank if one of said group of memory units fails; said buffer means being divided into a number of channels corresponding to the number of memory channels, each said channel being divided into associated portions of buffer segments; and a control means operative to control the transfer of data and check bytes or groups of bits to and from said memory banks, including allocating a buffer segment for a read or write request from the host computer of a sufficient size for the data, and controlling said memory banks to seek data stored in different memory banks simultaneously.

The present invention still further provides a computer storage system comprising a plurality of memory units arranged into a two dimensional array having at least three memory channels arranged in parallel, each said memory channel comprising a plurality of memory units connected by a bus such that each memory unit is independently accessible; respective memory units of said memory channels forming a memory bank; and a controller comprising buffer means interfaced to said memory units and for holding information read from said memory channels; said buffer means being controlled to form a plurality of buffer segments for addressably storing data read from or written to said memory units; a logic circuit connected to said buffer means to recombine bytes or groups of bits read from ones of a group of said memory units in a memory bank, parity means operative to use a check byte or group of bits read from one of said memory units in said memory bank to regenerate information read from said group of memory units if one of said group of memory units fails; and control means for controlling the transfer of data to and from said host computer and said memory units, including allocating a buffer segment for a read or write request from the host computer of a sufficient size for the data, and controlling said memory banks to seek data stored in different memory banks simultaneously.

Conveniently the system of the present invention can be termed RAID-53 since it utilises a combination of RAID-3 and RAID-5 to provide for fast random access. RAID-53 like RAID-5 allows for simultaneous reads by multiple users from all the disk banks in the system whilst also reducing the read time since the data is split between a number of disks which are read simultaneously.

In order to increase the speed of access to data stored in the disk array using RAID-53 the disk banks can be addressably segmented such that respective segments on sequential banks have a sequential address. This allows sequential data to be written to segments on sequential banks and thus distribute or "stripe" the data across the memory banks. This technique is termed hereinafter "overlay bank stripping".

This organisation of data on the disk array is controlled by the controller and not the host computer. The controller assigns addresses to segments of the disk banks in such a way that when data is written to the disk array it is striped across the banks.

This stripping of the data is also applicable to RAID-35 and will allow data to be read or stored on different banks simultaneously.

Preferably the memory units are disk drives and there are five per memory bank, i.e. five memory channels, one disk containing the check information, four disks containing the data. If the currently standard disk drive interface SCSI-1 (Small Computer Systems Interface) is used then since this has an eight address limit, one of which will be used by a controller, seven memory banks can be used. Alternatively if SCSI-2 is used then 15 banks can be used. The present invention is not however limited to the use of such an interface and any number of memory banks could be used. In fact the more memory banks that are present, the more that can be simultaneously undertaking a seek operation, thus reducing data access time for the host computer.

Preferably for optimum performance, the disk drives of a memory bank have their spindles synchronised.

This combination of RAID-3 and RAID-5 provides a simultaneous random access facility with a performance in excess of the theoretical maximum performance of RAID-5 systems with five slave bus drives. In addition the performance penalties of Read-Modify-Write characteristics of RAID-5 systems are avoided. What is provided is a fast and simple RAID-3 type Read/Write facility.

The RAID-53 system also sustains maximum transfer rate under a "single" disk drive failure condition per "bank" of disk drives.

During busy I/O requests the control means can queue host data requests for memory banks and carry out the data seek and transfer when the memory bank containing the requested data is not busy. Preferably the order in which these seeks take place is optimimsed to provide optimised seek ordering.

Preferably, when a write request is received by the controller, it can effect the immediate writing of the data to a memory bank to the detriment of any pending read or write requests. This prevents any important data being lost due to power failure for instance when the data normally would be held in a buffer segment.

In a preferred embodiment which increases the number of memory banks considerably, a number of buffer means, logic circuits and parity means are provided together with a number of associated two dimensional arrays of memory units. In this arrangement the control means is operative to control the transfer of data to and from the host computer and the three dimensional array of memory units formed of layers of the two dimensional arrays.

The hardware utilised for the RAID-35 system of PCT/GB90/01557 can be the same as that used for the RAID-53. Thus it possible to provide RAID-35 and RAID-53 as options for the same hardware or they can be provided together and will share the hardware. In one shared system, a first portion of the buffer means is allocated for RAID-53. The remaining buffer memory is allocated for RAID-35 use. The memory banks can be shared or a number of them can be allocated for RAID-35 and the rest for RAID-53.

The RAID-35 operation is as follows. The transfer of sequential data to the host computer in response to requests therefrom is controlled by first addressing the buffer segments in the allocated part of the buffer means to establish whether the requested data is contained therein and if so supplying said data to said host computer. If the requested sequential data is not contained in the buffer segments of the allocated portion of the buffer means, data is read from the memory units and supplied to the host computer. Further data is read from the memory units which is logically sequential to the data requested by the host computer and the further data is stored in a buffer segment in the allocated portion of the buffer means. The control means also controls the size and number of buffer segments in the portion of the buffer means allocated for RAID-35 usage.

The array of disk drives provided by the RAID-35 and RAID-53 systems provide redundancy in the event of disk drive failure. In one embodiment of the invention there can also be provided redundancy in controllers. If a second controller is provided at a different address on the buses of the array then in the event of a failure of the main controller, the auxiliary controller can be activated with little or no down time of the system. The controller can then be repaired or replaced whilst the system is still running.

The present invention also provides a plurality of buffer means each for interfacing a plurality of memory units arranged into a two dimensional array having at least three memory channels, each memory channel comprising a plurality of memory units connected by a bus such that each memory unit is independently accessible; respective memory units of said memory channels forming a memory bank; a plurality of logic circuits connected to respective said buffer means to recombine bytes or groups of bits read from ones of a group of said memory units of a memory bank and stored in said buffer segments to generate the requested data; said logic circuits each including parity means operative to use a check byte or group of bits read from one of said memory units of said memory bank to regenerate data read from said group of memory units if one of said group of memory units fails; said buffer means being divided into a number of channels corresponding to the number of memory channels, each channel being divided into associated portion of buffer segments; and control means operative to control the transfer of data from a three dimensional array of memory units formed from a plurality of said two dimensional arrays to said host computer in response to requests therefrom by first addressing said buffer segments to establish whether the requested data is contained therein and if so supplying said data to said host computer, and if the requested data is not contained in the buffer segments, reading said data from the memory units, supplying said data to said host computer, reading from said memory units further data which is logically sequential to the data requested by said host computer and storing said further data in a buffer segment; said control means further controlling said buffer means to control the number and size of said buffer segments.

In this RAID-35 arrangement a three dimensional array of disk drives is provided to increase storage capacity.

Although at present the most commonly form of redundant array of inexpensive disks used utilises magnetic disk drives, the present invention is not limited to the use of such disk drives. The present invention is equally applicable to the use of any memory device which has a long seek time for data compared to the data transfer rate once the data is located. Such media could, for instance, be an optical compact disk.

Thus such an array, according to the present invention, provides large scale storage of information together with the faster data transfer rates and better performance with regard to multi-user applications, and security in the event of any one drive failure (per bank). Indeed, the mean time between failures (MTBF) of such an array (when meaning the mean time between two simultaneous drive failures (per bank), and which is required in order to result in information being lost beyond recall) is measured in many thousands of years with presently available disk drives each having individual MTBFs of many thousands of hours.

BRIEF DESCRIPTION OF THE DRAWINGS

Examples of the present invention will now be described with reference to the accompanying drawings in which:

FIGS. 14a and 14b and 15, 15a and 15b are flow diagrams illustrating the software steps performed by the 80376 central controller of FIG. 1 during RAID-53 operation.

FIGS. 16a, 16b, 16aa, 16bb, 16cc, 16dd, 17, 17a, 17b, 18, 19, 19a and 19b to 20 are flow diagrams illustrating the software steps performed by the slave bus controllers of FIG. 1 during RAID-53 operation.

FIG. 20 is a block diagram of an embodiment of the present invention illustrating the access points for RAID-53 operation.

FIG. 21 illustrates a block diagram of a three dimensional memory array according to one embodiment of the present invention.

FIG. 22 illustrates the use of a redundant controller according to one embodiment of the present invention.

DETAILED DESCRIPTION OF PREFERRED EMBODIMENTS

Figure 1:
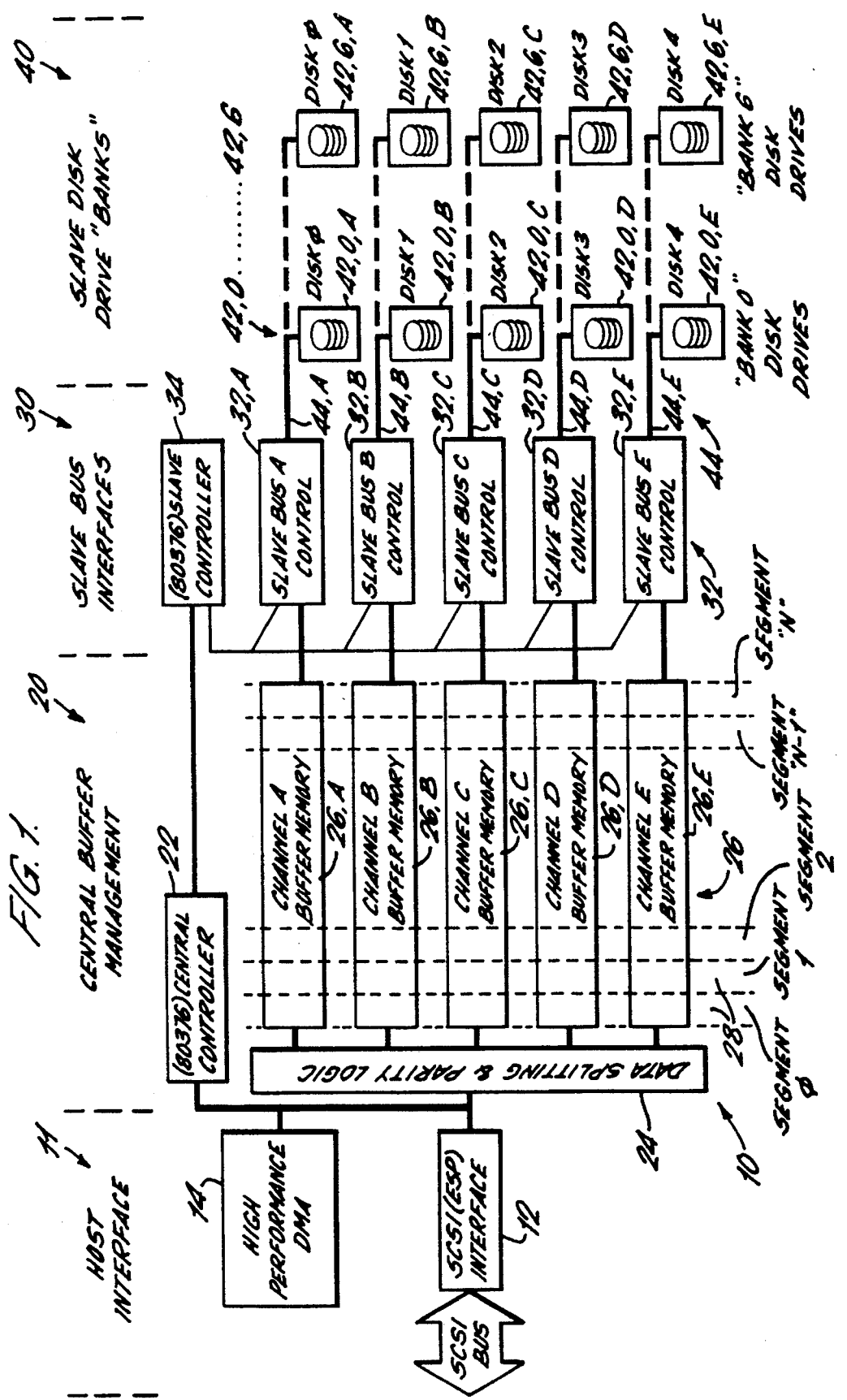
FIG. 1 is a block diagram of the controller architecture of a disk array system according to one embodiment of the present invention.

FIG. 1 illustrates the architecture of the RAID-35 and RAID-53 disk array controller, and initially both systems will be considered together.

In FIG. 1 of the drawings the internal interface of the computer memory controller 10 is termed the ESP data bus interface and the interface to the host computer is termed the SCSI interface. These are provided in interface 12. The SCSI bus interface communicates with the host computer (not shown) and the ESP interface communicates with a high performance direct memory access (DMA) unit 14 in a host interface section 11 of the computer memory controller 10. The ESP interface is 16 bits (one word) wide.

The host interface section communicates with a central buffer management (CBM) section 20 which comprises a central controller 22, in the form of a suitable microprocessor such as the Intel 80376 Microprocessor, and data splitting and parity control (DSPC) logic circuit 24. These perform the function of splitting information received from the host computer into four channels, and generating parity information for the fifth channel. The DSPC 24 also combines the information on the first four channels and, after checking against the parity channel, transmits the combined information to the host computer. Furthermore, the DSPC 24 is able to reconstruct the information from any one channel, should that be necessary, on the basis of the information from the other four channels.

The DSPC 24 is connected to a central buffer 26 which is divided into five channels A to E, each of which is divisible into buffer segments 28. Each central buffer channel 26,A through 26,E have the capacity to store up to half a megabyte of data for example, depending on the application required. For RAID-35, each segment may be as small as 128 kilobytes for example so that up to 16 segments can be formed in the buffer. For RAID-53 each segment will be as small as the minimum data request from the host computer.

The central buffer 26 communicates with five slave bus controllers 32 in a slave bus interface (SBI) section 30 of the memory controller 10.

Each slave bus controller 32,A through 32,E communicates with up to seven disk drives 42,0 to 42,6 along SCSI-1 buses 44,A through 44,E so that the drives 42,0,A through 42,O,E form a bank 0, of five disk drives and so also do drives 42,1,A through 42,1,E etc. to 42,6,A through 42,6,E.

The seven banks of five drives effectively each constitute a single disk drive, each individually and independently accessible. This is made possible by the use of SCSI-1 buses, which allow for eight device addresses. One address is taken up by the slave bus controller 32 whilst the seven remaining addresses are available for seven disk drives. Thus for the RAID-35 system the storage capacity of each channel can therefore be increased sevenfold and the slave bus controller 32 is able to access any one of the disk drives 42 in the channel independently. The use of more than one bank of disk drives is essential for the realisation of the advantage of RAID-53 operation.

This arrangement of banks of disk drives is not only applicable to the arrangement shown in FIG. 1, but is also applicable to the RAID-3 arrangement. Information stored in the disk drives of one bank can be accessed virtually simultaneously with information being accessed from the disk drives of another bank. This arrangement therefore gives an enhancement in access speed to data stored in an array of disk drives.

In so far as the host computer is concerned, its memory consists of a number of sectors each identified by a unique address number. Where or how these sectors are stored on the various disk drives of the memory 40 is a matter of no concern to the host computer, it must merely remember the address of the data sectors it requires. Of course, addresses themselves may form part of the data stored in the memory.

On the other hand, one of the functions of the central controller 22 is to store data on the various disk drives efficiently. Moreover each sector in so far as the host is concerned, is split between four disk drives in the known RAID-3 format. Under RAID-35 operation, the central controller 22 arranges to store sectors of information passed to it by the host computer, in an ordered fashion so that a sector on any given disk drive is likely to contain information which logically follows from a previous adjacent sector.

To optimise performance, the disk drives of a bank should have their spindles synchronised.

Operation under RAID-35

When the host computer requires data, the read request is received by the central controller 22 which passes the request to the slave bus interface (SBI) controller 32. The slave bus control 32 reads the disk banks 40 and selects the appropriate data from the appropriate banks of disks. The DSPC circuit 24 receives the requested data and checks it is accurate against the check data in channel E.

If there is any error detected by the parity check the controller may automatically try to re-read the data, if a parity error is still detected the controller may return an error to the host computer. If there is a faulty drive this can be isolated and the system arranged to continue working employing the four good channels, in the same way and with no loss of performance, until the faulty drive is replaced and rebuilt with the appropriate information.

Assuming however that the data is good, the central controller 22 first responds to the data read request by transferring the information to the SCSI-1 interface 12. However, it also instructs further information logically sequential to the requested information to be read. This is termed "read ahead information". Read ahead information up to the capacity presently allocated by the central controller 22 to any one of the data buffer segments 28 is then stored in one buffer segment 28.

When the host computer makes a further request for information, it is likely that the information requested will follow on from the information previously requested. Consequently, when the central controller 22 receives a read request, it first interrogates those buffer segments 28 to determine if the required information is already in the buffer. If the information is there, then the central controller 22 can respond to the user request immediately, without having to read the disk drives. This is obviously a much faster procedure and avoids the seek delay.

On those occasions when the required information is not already in the buffer, then a new read of the disk drives is required. Again, the requested information is passed on and sequential read ahead information is fed to another buffer segment. This process continues until all the buffer segments are filled and the system is maintained with its segments permanently filled. Of course, there comes a point when all the segments are filled, but still the disk drives must be read. It is only at this point that a buffer segment is finally deallocated by the central controller 22, by keeping note of which buffer segments buffers 28 are or have been used most frequently, and dumping the most infrequently used one.

During the normal busy operation of the host computer, the central controller 22 will have allocated at least as many buffer segments 28 as there are application programs, up to the maximum number of segments available. Each buffer segment will be kept full by the central controller 22 ordering the disk drive seek commands in the most efficient manner, only over-riding that ordering when a buffer segment has been, say 50% emptied by host requests or when a host request cannot be satisfied from existing buffer segments 28. Thus all buffer segments are kept as full as possible with read ahead data.

To write information to the disk drives, a similar procedure is followed. When a write instruction is received by the central controller 22 information is split by DSPC circuits 24 and appropriate check information created. The five resulting components are placed in allocated write buffer segments. The number of write buffer segments may be preselected, or may be dynamically allocated as and when required. In any event, write buffer segments are protected against de-allocating until its information has been written to disk. Actual writing to disk is only effected under instruction from the host computer, if and when a segment becomes full and the system cannot wait any longer, or, more likely, when the system is idle and not performing any read operations.

In any event, simultaneous writes appear to be happening in so far as the host computer is concerned, because the central controller 22 is capable of handling commands very rapidly and storing writes in buffers while waiting for an opportunity for the more time consuming actual writing to disk drives.

This does not mean however, that in the event of power failure, some writes, which the user will think have been recorded on disk, may in fact have been lost by virtue of its temporary location in the random access buffer at the time of power failure. In that event a restored disk drive system from back-up copies is required.

Alternatively, a hardware switch can be provided to ensure that all write instructions are effected immediately, with write information only being stored in the buffer segments transiently before being written to disk. This removes the fear that a power loss might result in data being lost which was thought to have been written to disk although not actually effected by the memory system. There is still however, the unlikely exception that information may be lost when a power loss occurs very shortly after a user has sent a write command, but in that event, the user is likely to be conscious of the problem. If this alternative is utilised, it does of course affect the performance of the computer.

Operation under RAID-53

When the host computer requires data a request is received and a buffer segment allocated for that data. The read request is received by the central controller 22 which passes the request to the slave bus controller 32. The slave bus controller 32 reads the disk banks 40 and selects the appropriate data from the appropriate banks of disks. The DSPC circuit 24 receives the requested data and checks it is accurate against the check data in channel E.

If there is any error detected by the parity check the controller may automatically retry to read the data. If a parity error is still detected the controller may return an error to the host computer. If there is a faulty drive this can be isolated and the system arranged to continue working employing the four good channels, in the same way and with no loss of performance, until the faulty drive is replaced and rebuilt with the appropriate information.

Assuming that the data is good the central controller 22 responds to the data read request by transferring the data to the SCSI-1 interface 12, and then de-allocating the buffer segment. The disk bank is then free to accept another read request and can commence a seek operation under the command of the central controller 22.

The size of the buffer segments is determined by the size of the data requested by the host computer. No data is read ahead from the disk drives.

The central controller 22 is thus able to receive the read requests and determine in which disk bank that data lies. If the disk bank is idle then the disk bank can be instructed to seek the data. Simultaneously the other disk banks may be seeking data requested by the host computer at an earlier date, and once this has been located the central controller 22 can read the disk bank and pass the data to the buffer segments for reconstruction, from where it is passed to the SCSI-1 interface 12.

Figure 14B:
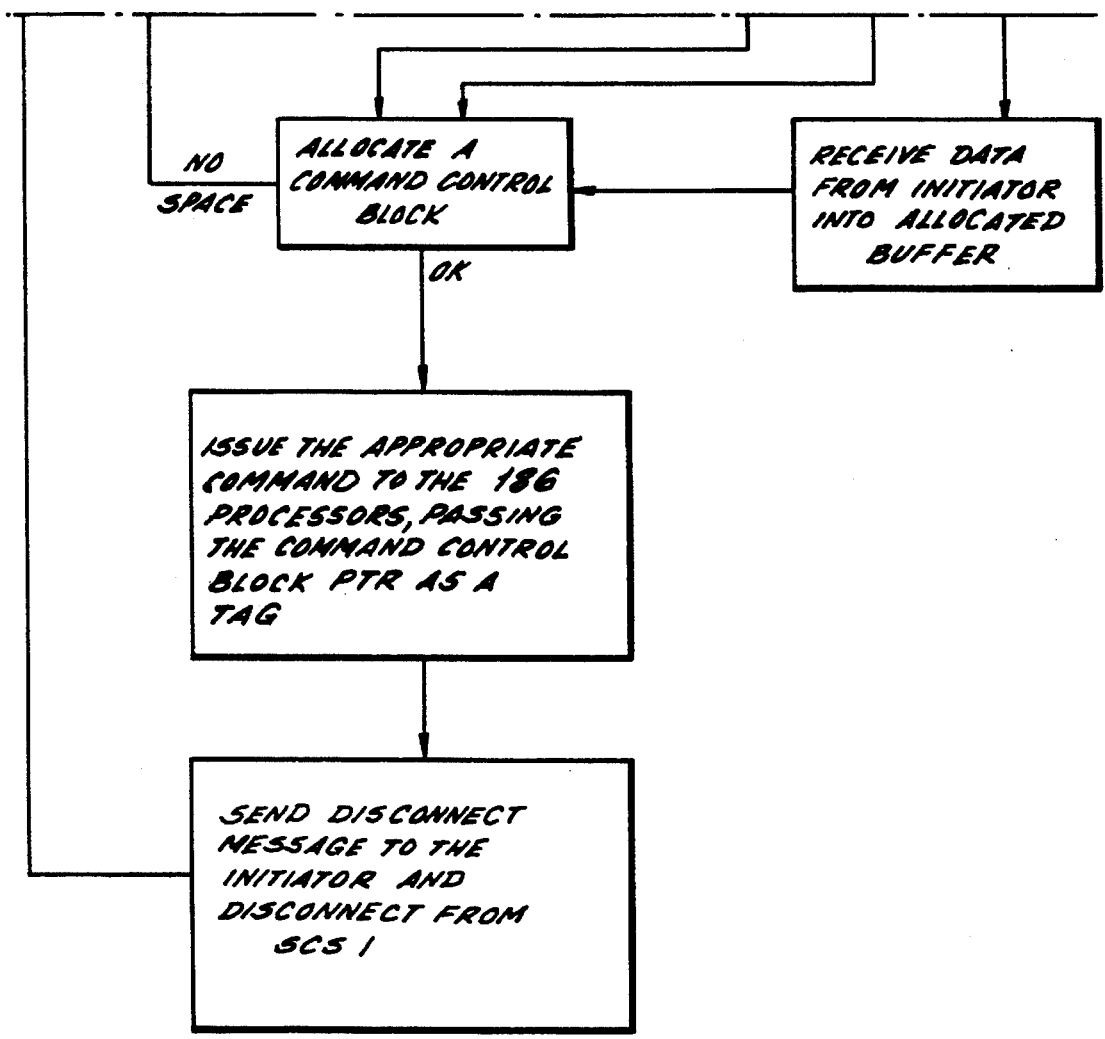

FIG. 14 illustrates the seven access points to the seven disk banks. Each disk drive of each bank has a unique bus (SCSI) address and can thus be accessed independently by the computer memory controller 100. Thus up to seven disk banks can be operating simultaneously to seek data requested by the host computer. While a disk bank is seeking it is disconnected from the SCSI-1 interface. When the data is located this is indicated to the central controller 22 which can then read the data.

If a disk bank is busy when a new read request is received then the central controller 22 can queue these requests. To provide an optimised seek ordering, the queued read requests may not necessarily be performed in the order in which the host computer issued the commands. Such queuing of read requests could also be performed on the slave bus controllers 32.

For write operations very much the same thing happens. However the central controller 22 is provided with the capability of "forcing" the incoming data to be "immediately" written to the required bank of disk drives, rather than being queued with pending Read/Write commands. This ensures that data thought by the host computer to be written to disk is so written, in case of for instance power failure where any data to be written to the disks that is stored in the buffer memory 26 would be lost.

Detailed Operation of Hardware for both RAID-35 and RAID-53

The detailed operation of the hardware data splitting, parity generation and checking logic, and buffer interface logic will now be described with reference to FIGS. 2 to 5 for both RAID-35 and RAID-53.

Figure 2:
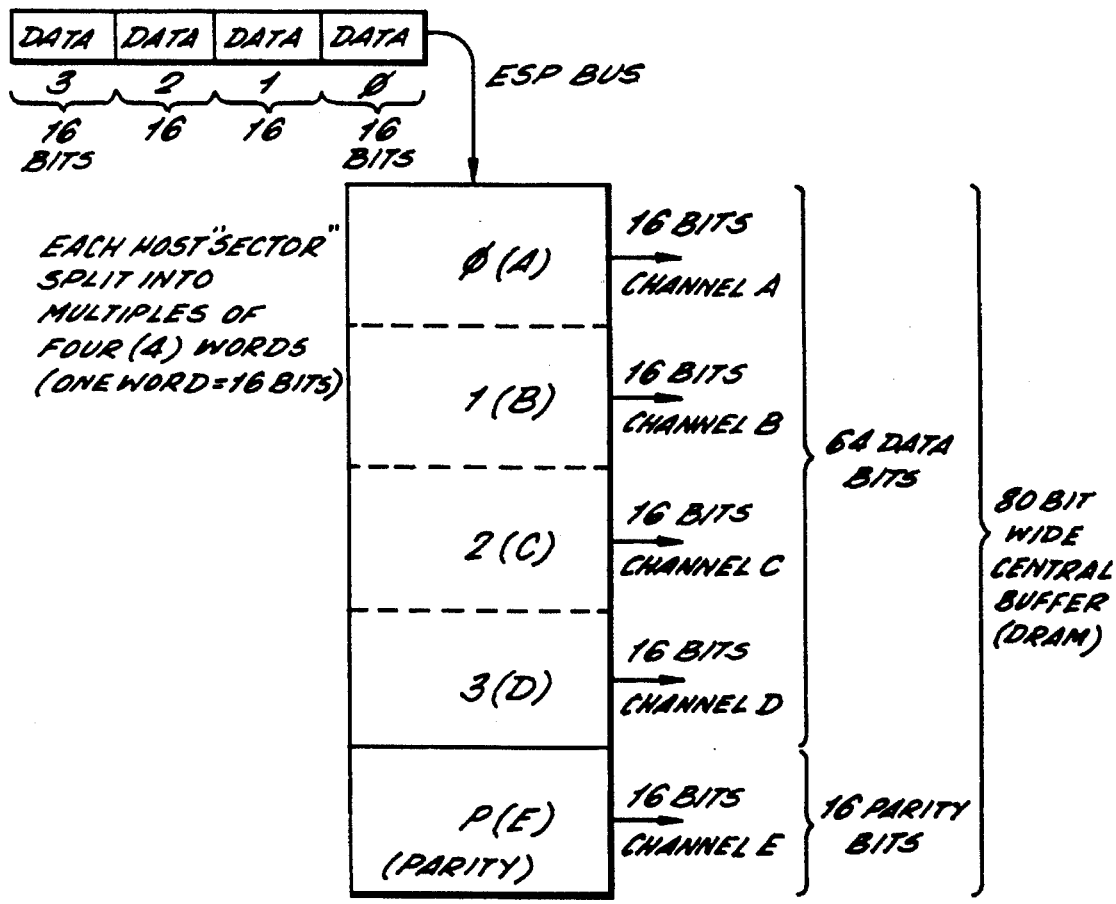
FIG. 2 illustrates the operation of the data splitting hardware of one embodiment of the present invention.

Referring to FIG. 2, the controllers internal interface to the host system hardware interface is 16 bits (one word) wide. This is the ESP data bus. For every four words of sequential host data, one 64 bit wide slice of internal buffer data is formed. At the same time, an additional word or 16 bits of parity data is formed by the controller; one parity bit for four host data bits. Thus the internal width of the controller's central data bus is 80 bits. This is made up of 64 bits of host data and 16 bits of parity data.

Figure 3:
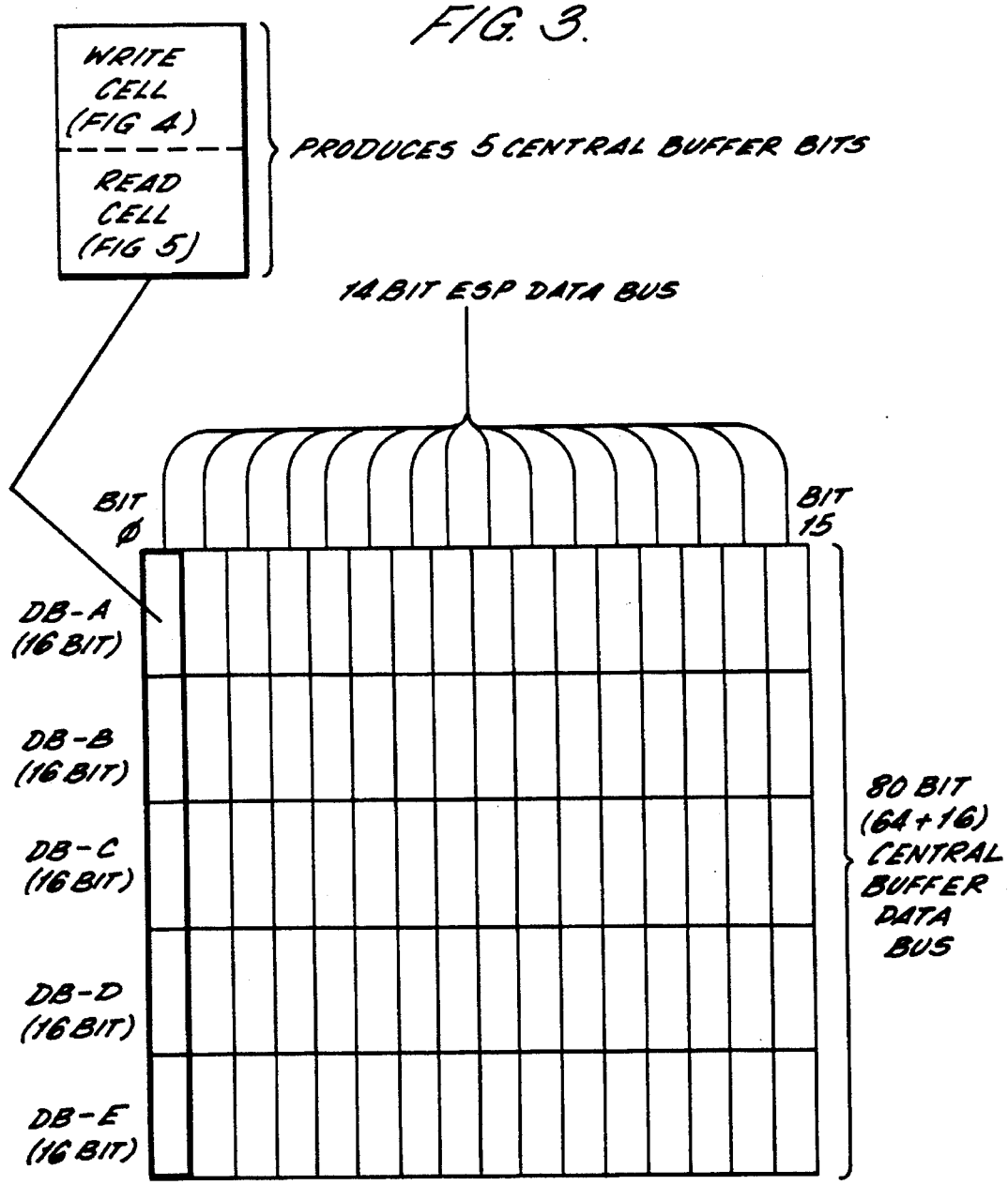
FIG. 3 illustrates the read/write data cell matrix of one embodiment of the present invention.

The data splitting and parity logic 24 is split up into 16 identical read/write data cells within the customised ASICS (application specific integrated circuits) design of the controller. The matrix of these data cells are shown in FIG. 3. Each of these data cells handles the same data bit from the ESP bus for the complete sequence of four ESP 16 bit data words. That is, with reference to FIG. 2, each data cell handles the same bit from each ESP bus word 0,1,2 and 3. At the same time, each data cell generates/reads the associated parity bit for these four 16 bit ESP bus data words.

For explanation purposes, only the first data bit 0 (DB0) will be described. Data bits DB1 through DB15 will be identical in operation and description.

Four basic operations are performed, namely

1. Writing host data
2. Reading of data to the host
3. Regeneration of "single failed channel" data during host read operations.
4. Rebuilding of data on a failed disk drive unit.

Writing of host data to the disk drive array

Figure 4:
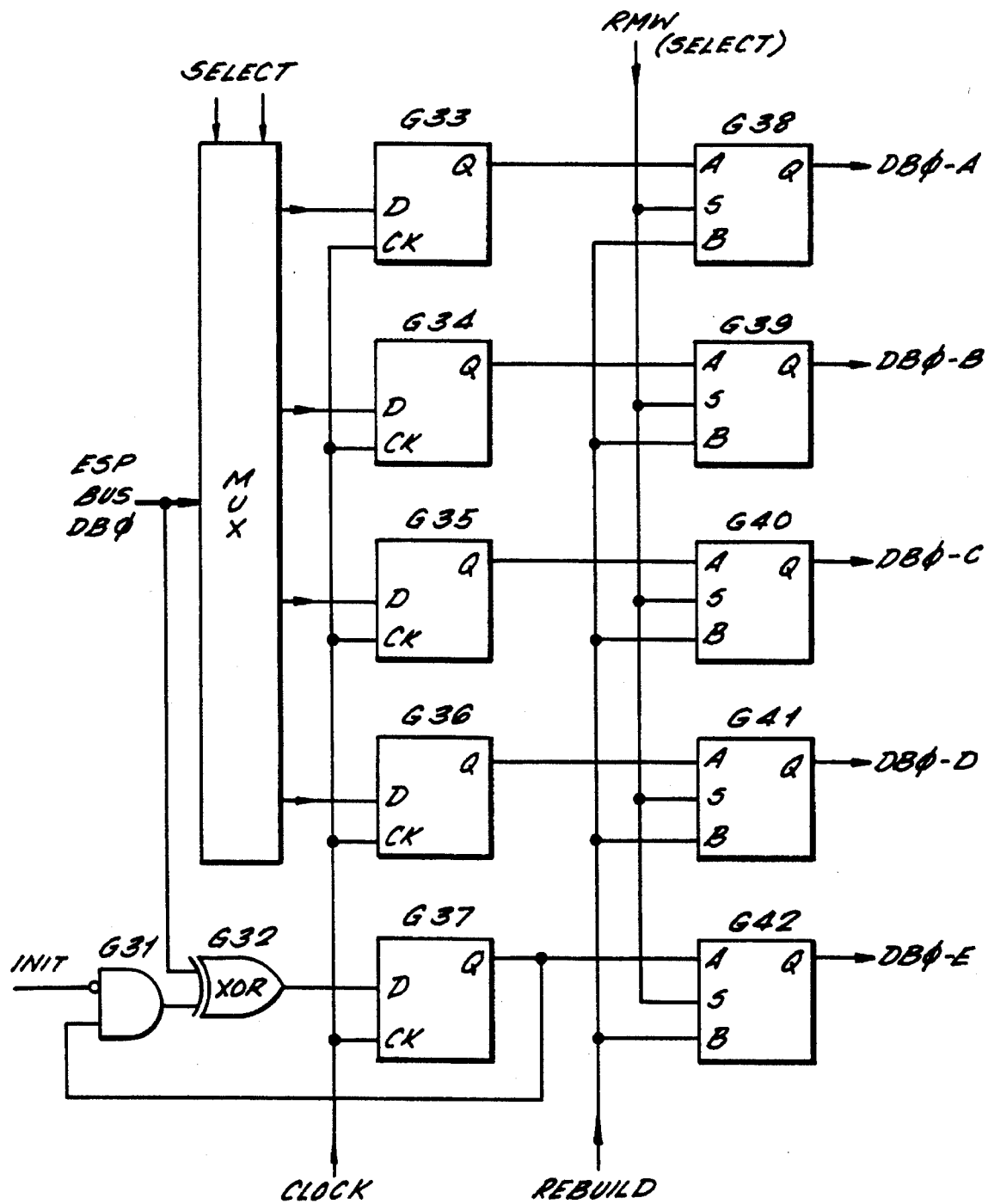
FIG. 4 illustrates a write data cell of one embodiment of the present invention.

Referring now to FIG. 4, as the corresponding data bit from each host 16 bit word is received on the ESP data bus, each of these four bits is temporarily stored/latched in devices G38 through G41. As each bit appears on the ESP bus, it is steered through the multiplexor under the control of the two select lines to the relevant D-type latches G33 through G36, commencing with G33. At the end of this initial operation, the four host 16 bit words (64 data bits) will have been stored in the relevant gates G38 through G41 within all 16 data cells. The four DB0 data bits are now called DB0-A through DB0-D.

During the write operations, the RMW (buffer read modify write) control signal is set to select input A from all devices G38 through G42. Under these situations, the rebuild line is not used (don't care).

As each bit is clocked into the data cell, the corresponding parity data bit is generated via G31, G32, and G37. At the end of the sequence of the four bit 0's from each of the four incoming ESP bus host data words, the resultant parity bit will have been generated and stored on device G42. This is accomplished as follows. As the first bit-0 (DB0-A) appears on the signal DB0, the INIT line is driven high/true and the output from the gate G31 is driven low/off. Whatever value is present on DB0 will appear on the output of gate G32, and at the correct time will be clocked into the D-type G37. The value of DB0 will now appear on the Q output of G37. The INIT signal will now be driven low/off, and will now aid the flow of data through G31 for the next incoming three data bits on DB0. Whatever value was stored as DB0-A on the output of gate G37 will now appear on the output of gate G31, and as the second DB0 bit (DB0-B) appears on the signal DB0, an Exclusive OR value of these two bits will appear on the output of gate G32. At the appropriate time, this new value will be clocked into the device G37. At the end of the clock cycle, the resultant Q output of G37 will now be the Exclusive OR function of DB0-A and DB0-B. This value will now be stored on device G42. The above operation will continue as the remaining two DB0 bits (DB0-C and DB0-D) appear on the signal DB0. At the end of this operation, the accumulative Exclusive OR function of all bits DB0-A through DB0-D will be stored on device G42, and at the same time, bits DB0-A through DB0-D will be stored on devices G38 through G41 respectively.

The accumulative Exclusive OR (XOR) value of DB0-A through DB0-D is generated in this manner so as to preserve buffer timing and synchronisation procedures.

The five outputs DB0-A through DB0-E are present for all data bits 0 through 15 of the four host data words. The total of 80 bits are now stored in the central buffer memory (DRAM). The whole procedure is repeated for each sequence of four host data words (8 host data bytes).

As each "sector" of slave disk drive data is assembled in the central buffer, it is written to the slave disk drives (to channel A through channel E) within the same bank of disk drives.

If a failed slave channel, or disk drive exists, then the controller will mask out that drive's data and no data will be written to that channel/disk drive. However, the data will be assembled in the central buffer in the normal manner.

Reading of array disk drive data to the host system

Figure 5:
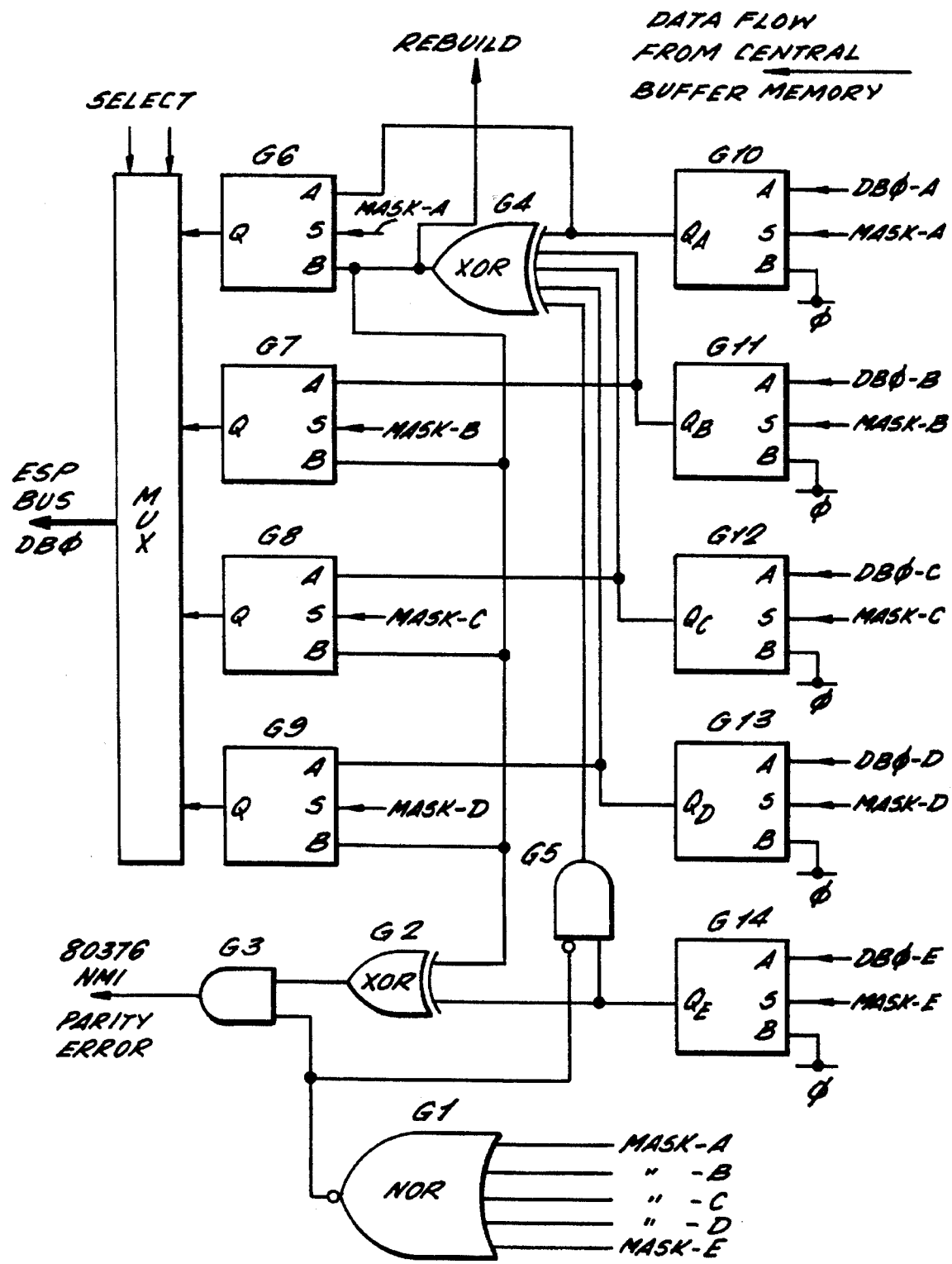
FIG. 5 illustrates a read data cell of one embodiment of the present invention.

Referring now to FIG. 5, in response to a host request, data is read from the disk array and placed in the central buffer memory 26. Also, in the reverse procedure to that for write operations, the 80 bits of central buffer data are loaded into devices G10 through G14 for each bit (4 data bits and 1 parity bit). Again we will only consider DB0. The resulting five bits are DB0-A through DB0-E. All read operations are checked for correct parity by regenerating a new parity bit and comparing this bit with the bit read from the slave disk drives.

Initially, the case of a fully functioning array will be considered with no faulty slave disk drives. In this case all mask bits (mask-A through mask-E) will be low/false, and all bits from the central buffer 26 will appear on the outputs of devices G10 through G14 via "A" inputs. Also, all data bits will appear on the outputs of devices G6 through G9 via their "A" inputs. After the central buffer read operation, the four data bits will simultaneously appear on the outputs of devices G6 through G9. In the reverse procedure to that for write operations, all data bits DB0-A through DB0-D will be reassembled on the ESP data bus through the mutilplexor under the control of the two select lines. As the data bits are read from the central buffer 26, the parity data bit is regenerated by the Exclusive OR gate G4 and compared at gate G2 with the parity data read from the slave disk drives at device G14. If a difference is detected, a NMI "non-maskable interrupt" is generated to the master processor device via gate G3. All read operations will terminate immediately or the controller may automatically perform read re-try procedures.

Gate G5 suppresses the effect of the parity bit DB0-E from the generation of the new parity bit. Gate G1 will suppress NMI operations if any slave disk drive has failed and the resultant mask bit has been set high/true. Also, gate G1, in conjunction with gate G5, will allow the read parity bit DB0-E to be utilised in the regeneration process at gate G4, should any channel have failed.

Regeneration of "single failed channel" data durinq host read Operations

Referring to FIG. 5, the single failed disk drive/channel will have its mask bit set high/true under the direction of the controller software. The relevant gates within G6 through G9 and G10 through G14 for the failed channel/drives will have their outputs determined by their "B" inputs, not their "A" inputs. Also, G1 will suppress all NMI generation, and together with gate G5, will allow parity bit DB0-E to be utilised at gate G4. In this situation, the four valid bits from gates G10 through G14 will "regenerate" the "missing" data at gate G4, and the output with gate G4 will be fed to the correct ESP bus data bit DB0 via a "B" input at the relevant gate G6 through G9.

For example consider the channel 2 disk drive to be faulty, and mask bit mask-C will be driven high/true. The output of gate G12 will be driven low and will not contribute to the output of gate G4. Also, the output of gate G1 will be driven low/false and will both suppress NMIs, and will allow signal DB0-E to be fed by gate G5 to gate G4. Gate G4 will have all correct inputs from which to regenerate the missing data and feed the data to the output of device G8 via its "B" input. At the correct time, this bit will be fed through the multiplexor to DB0.

Rebuilding of data on a failed disk drive unit

Referring now to FIGS. 4 and 5, to rebuild data, the memory controller must first read the data from the functioning four disk drives, regenerate the missing drive's data, and finally write the data to the failed disk drive after it has been replaced with a new disk drive.

With reference to FIG. 5 and the example given above for "regeneration of single failed channel data during host read operations", under rebuild conditions the outputs from gates G6 through G9 will not be fed to the ESP data bus. However, the regenerated data at the output of gate G4 will be fed to the "B" inputs of gates G38 through G42 of the write data cell in FIG. 4. Under rebuild conditions, the RMW signal will be set high/true and the outputs of devices G38 through G42 will be determined by the value of the rebuild data on signal rebuild. All channels of the central buffer memory 26 will have their data set to the regenerated data, but only the single replaced channel data will be written to the new disk drive under software control.

Detection of faulty channel/disk drive

The detection of a faulty channel/slave disk drive is as per the following three main criteria:1.

1. The master 80376 processor detects an 80186 channel (array controller electronics) failure due to an "inter-processor" command protocol failure.

2. An 80186 processor detects a disk drive problem i.e. a SCSI bus protocol violation.

3. An 80186 processor detects a SCSI bus hardware error. This is a complete channel failure situation, not just a single disk drive on that SCSI bus.

After detection of the fault condition, the channel/drive "masking" function is performed by the master microprocessor.

Under fault conditions, the masked out channel/drive is not written to or read from by the associated 80186 channel processor.

Operation of Software for RAID-35 Operation

Figure 6:
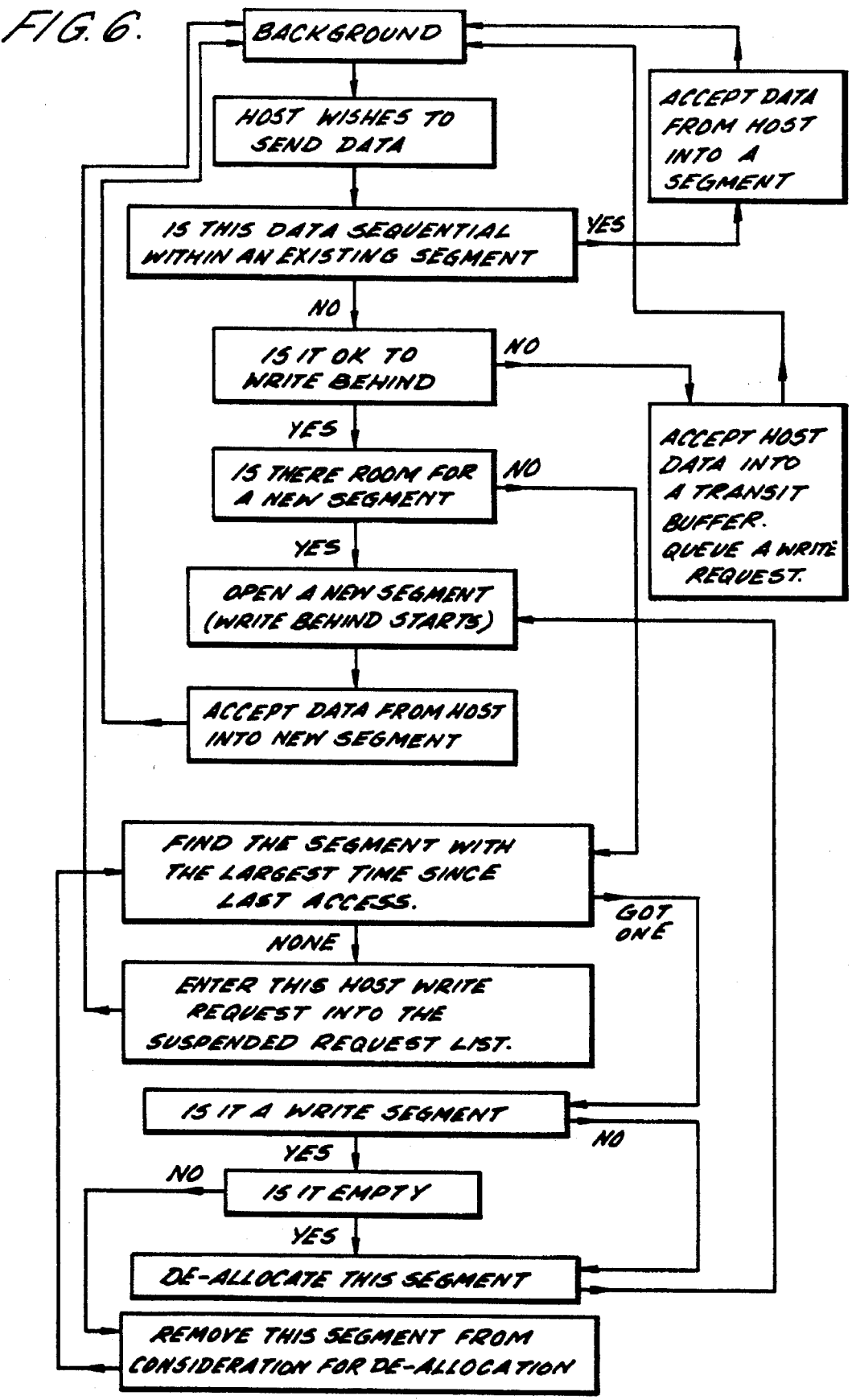
FIG. 6 is a flow diagram illustrating the software steps in write operations for RAID-35 operation according to one embodiment of the present invention.

FIG. 6 through to 13 are diagrams illustrating the operation of the software run by the central controller 22.

FIG. 6 illustrates the steps undertaken during the writing of data to the banks of disk drives. Initially the software is operating in "background" mode and is awaiting instructions. Once an instruction from the host is received indicating that data is to be sent, it is determined whether this is sequential within an existing segment. If data is sequential then this data is stored in the segment to form sequential data. If no sequential data exists in a buffer segment then either a new segment is opened (the write behind procedure illustrated in FIG. 8) and data is accepted from the host, or the data is accepted into a transit buffer and queued ready to write into a segment. If there is no room for a new segment then the segment is found which has been idle for the most time. If there are no such segments then the host write request is entered into a suspended request list. If a segment is available it is determined whether this is a read or write segment. If it is a write segment then if it is empty it is de-allocated. If it is not empty then the segment is removed from consideration for de-allocation. If the segment is a read segment then the segment is de-allocated and opened ready to accept the host data.

Figure 8:
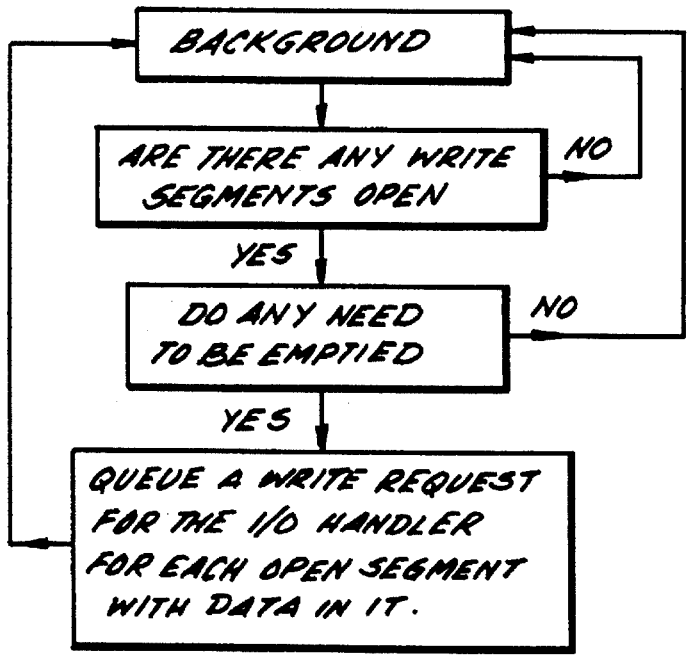
FIGS. 8 and 9 are flow diagrams illustrating the software steps for read ahead and write behind for RAID-35 operation according to one embodiment of the present invention.

The write behind procedure is illustrated in FIG. 8 and if there are any write segments open which need to be emptied, then a write request is queued for the I/O handler for each open segment with data in it.

Figure 7:
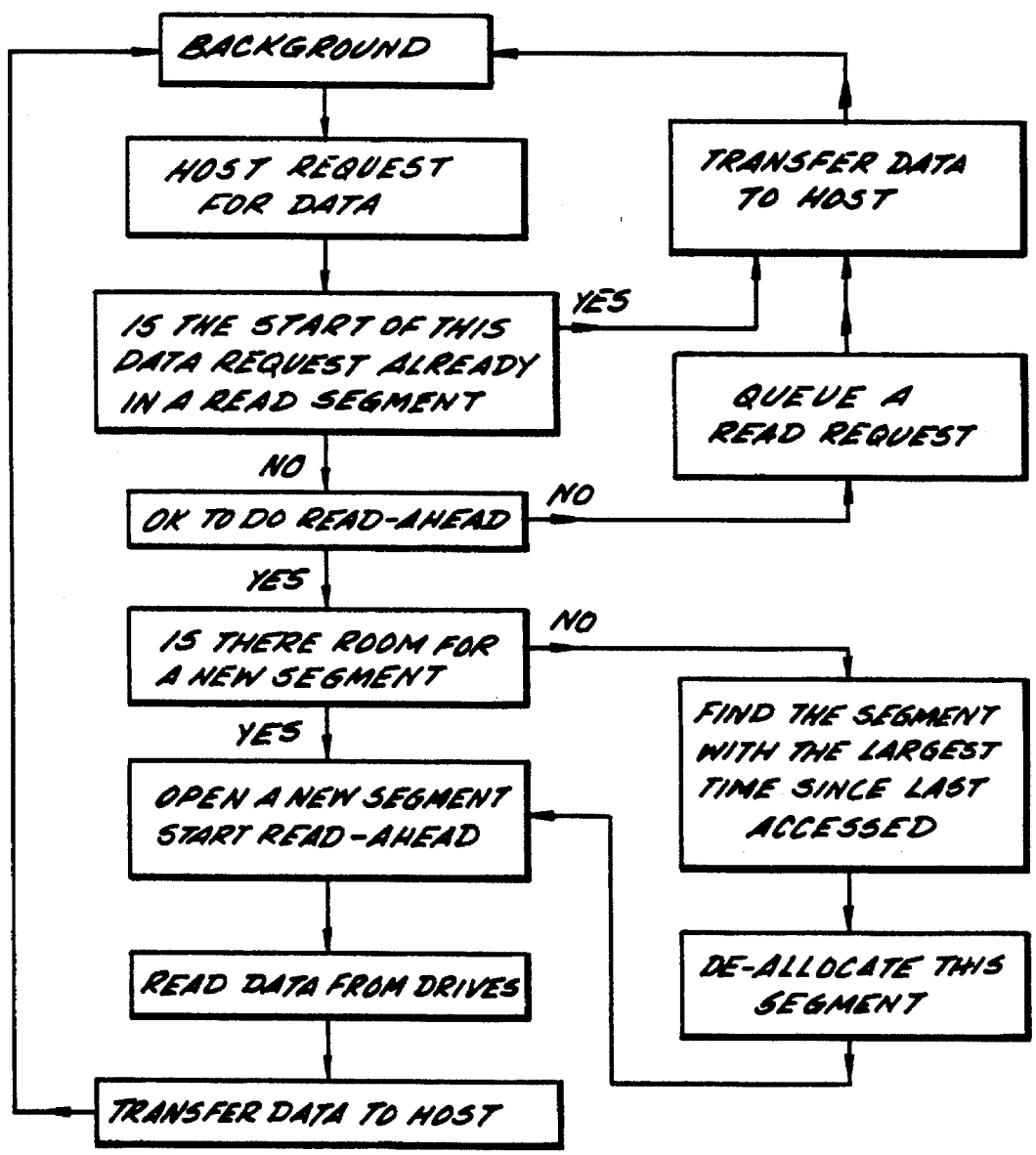
FIG. 7 is a flow diagram illustrating the software steps in read operations for RAID-35 operation according to one embodiment of the present invention.

FIG. 7 illustrates the steps undertaken during read operations. Initially, the controller is in a "background" mode. When a request for data is received from the host computer, if the start of the data requested is already in a read segment then data can be transferred from the central buffer 26 to the host computer. If the data is not already in the central buffer 26, then it is ascertained whether it is acceptable to read ahead information. If it is not acceptable then a read request is queued. If data is to be read ahead then it is determined whether there is room for a new segment. If there is then a new segment is opened and data is read from the drives to the buffer segment and is then transferred to the host computer. If there is no room for a new segment then the segment is found for which the largest time has elapsed since it was last accessed, and this segment is de-allocated and opened to accept the data read from the disk drives.

Figure 9:
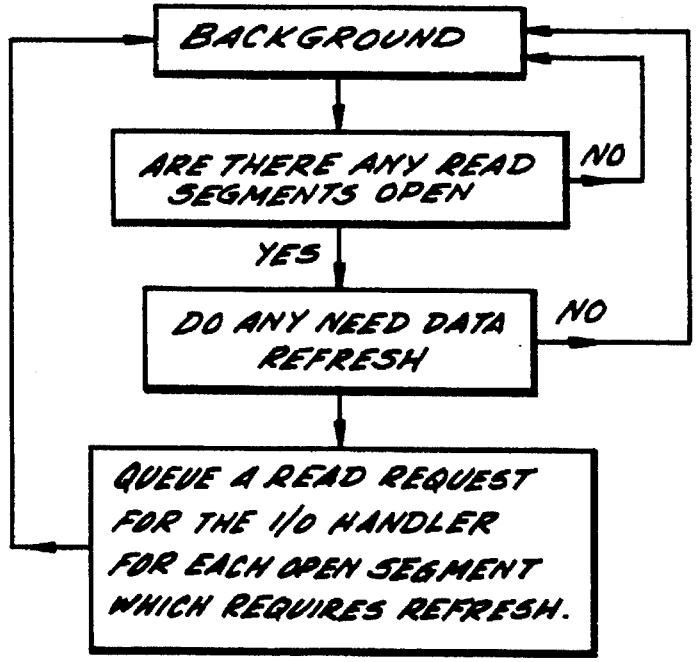

In order to keep the buffer segments 28 full, the read ahead procedure illustrated in FIG. 9 is formed. It is determined whether there are any read segments open which require a data refresh. If there is such a segment then a read request for the I/O handler for the segment is queued.

Figure 10:
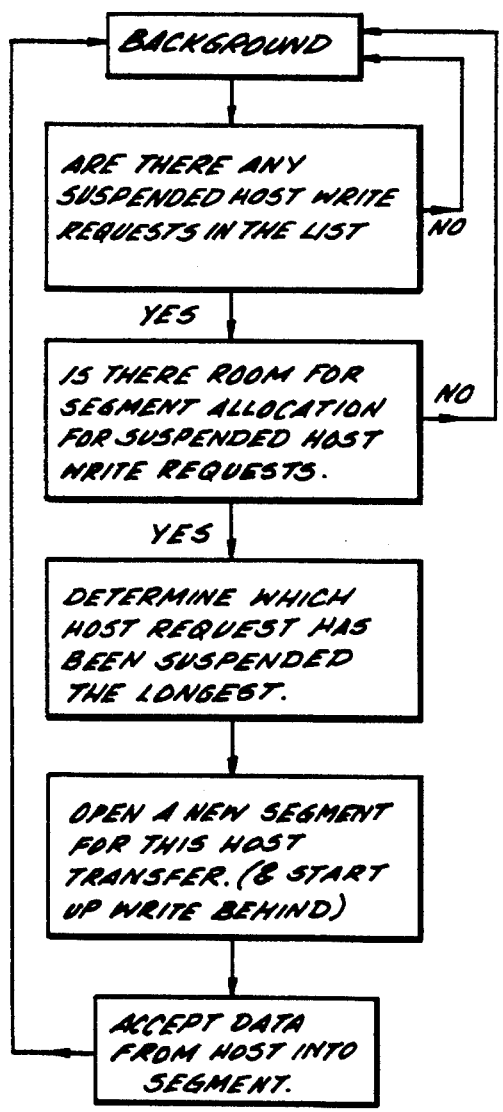
FIG. 10 is a flow diagram illustrating the software steps involved to restart suspended transfers for RAID-35 operation according to one embodiment of the present invention.

FIG. 10 illustrates the software steps undertaken to restart suspended transfers. It is first determined whether there are suspended host write requests in the list. If there is it is determined whether there is room for allocation of a segment for suspended host write requests. A new segment for the host transfer is opened and the host request which has been suspended longest is determined and data is accepted from the host computer into the buffer segment.

Figure 11:
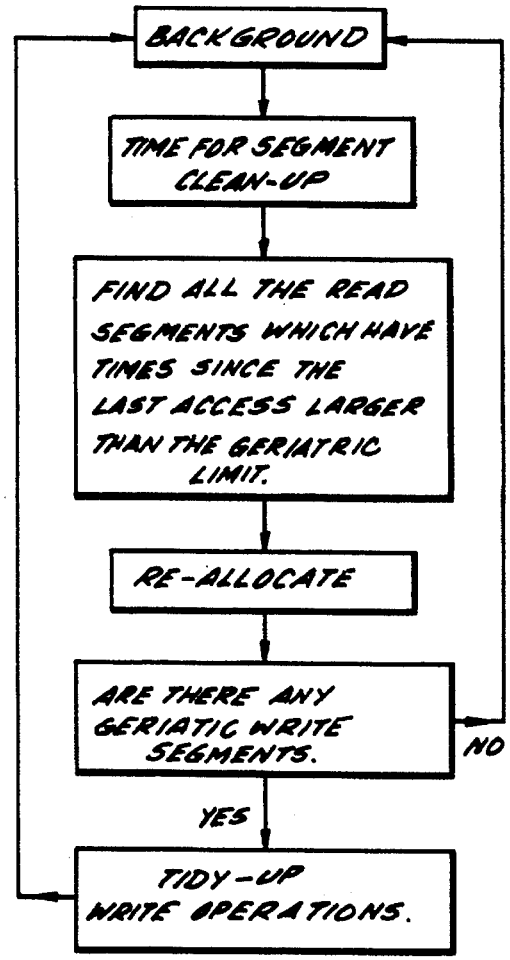
FIG. 11 is a flow diagram illustrating the software steps involved in cleaning up segments for RAID-35 operation according to one embodiment of the present invention.

FIG. 11 illustrates a form of "housekeeping" undertaken by the software in order to clean up the segments in the central buffer 26. It is determined at a point that it is time to clean up the buffer segments. All the read segments which have times since the last access time larger than a predetermined limit termed the "geriatric limit" are found and reallocated. Also it is determined whether there are any such write segments and if so write operations are tidied up.

Figure 12:
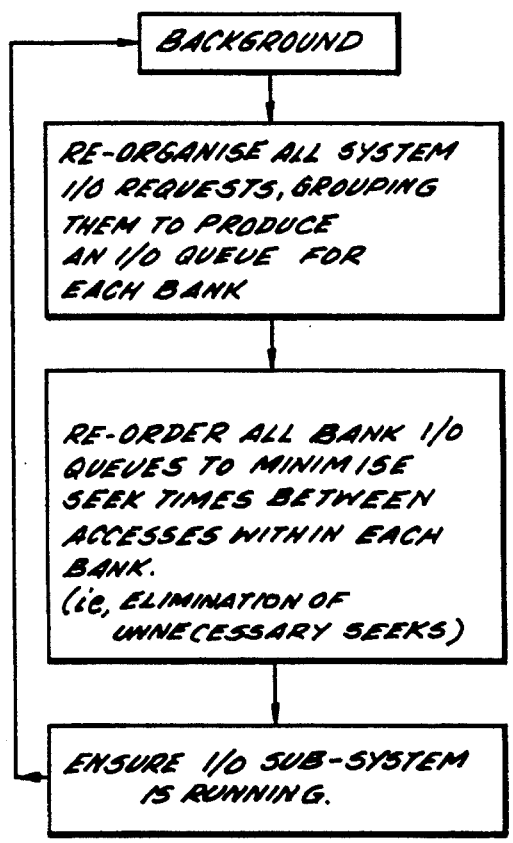
FIGS. 12 and 13 are flow diagrams illustrating the steps involved for input/output control for RAID-35 operation according to one embodiment of the present invention.
Figure 13:
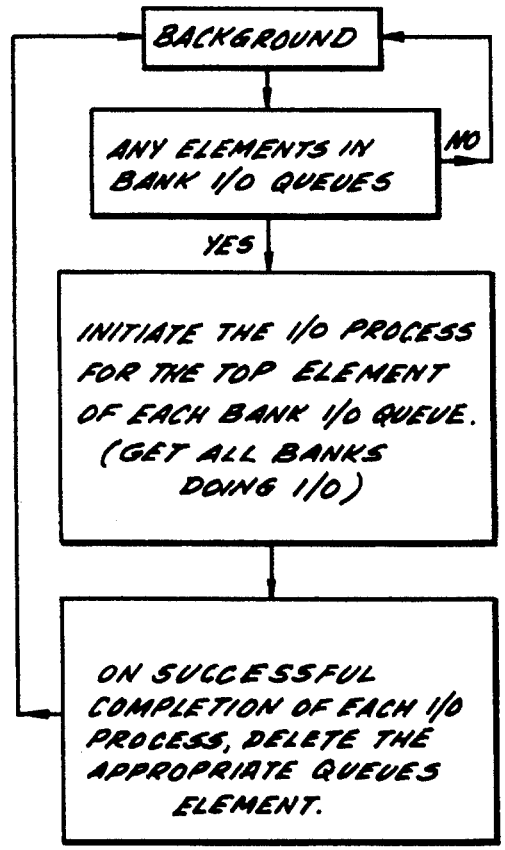

FIG. 12 illustrates the operation of the input/output handler, whilst FIG. 13 illustrates the operation of the input/output sub system.

All these procedures are performed by software which may be run on the central (80376) controller 22 in order to control and efficiently manage the transfer of data in the buffer segments 28, in order that the buffer 26 is kept as full as possible with data sequential to data requested by the host computer.

Operation of Software for RAID-53

FIGS. 14 through to 19 are diagrams illustrating the operation of the software run by the central controller 22 and the slave controllers 32 during RAID-53 operation.

FIG. 14 illustrates the steps undertaken by the central controller 22 when selected as the SCSI target. Once selected a command from the initiator (or host computer) is decoded and syntax checked. If a fault is detected the command is terminated by a check command status and the controller returns to background processing. If the syntax check indicates no errors then it is determined whether a queue tag message has been received to assign a queue position. If not and a command is already running a busy status is generated and the controller returns to background processing. If a command is not already running or if a queue tag message has been received it is determined whether data is required with the command. If data is required then a buffer segment is allocated for the data and if the command is to write data then data is received from the initiator into the allocated buffer segment. If there is no space available then a queue full status is generated and the controller returns to background processing. If the command is to read data or the command is to write data and data is received from the initiator into the allocated buffer then a command control block is allocated. If there is no space for this a queue full status is generated and the controller returns to background processing. If a command control block can be successfully allocated the appropriate command is issued to the slave bus controller 32 (an 80186 processor) and the command control tag pointer is passed as a tag. A disconnect message is then sent to the initiator and the controller returns to background processing.

Figures 15, 15A:
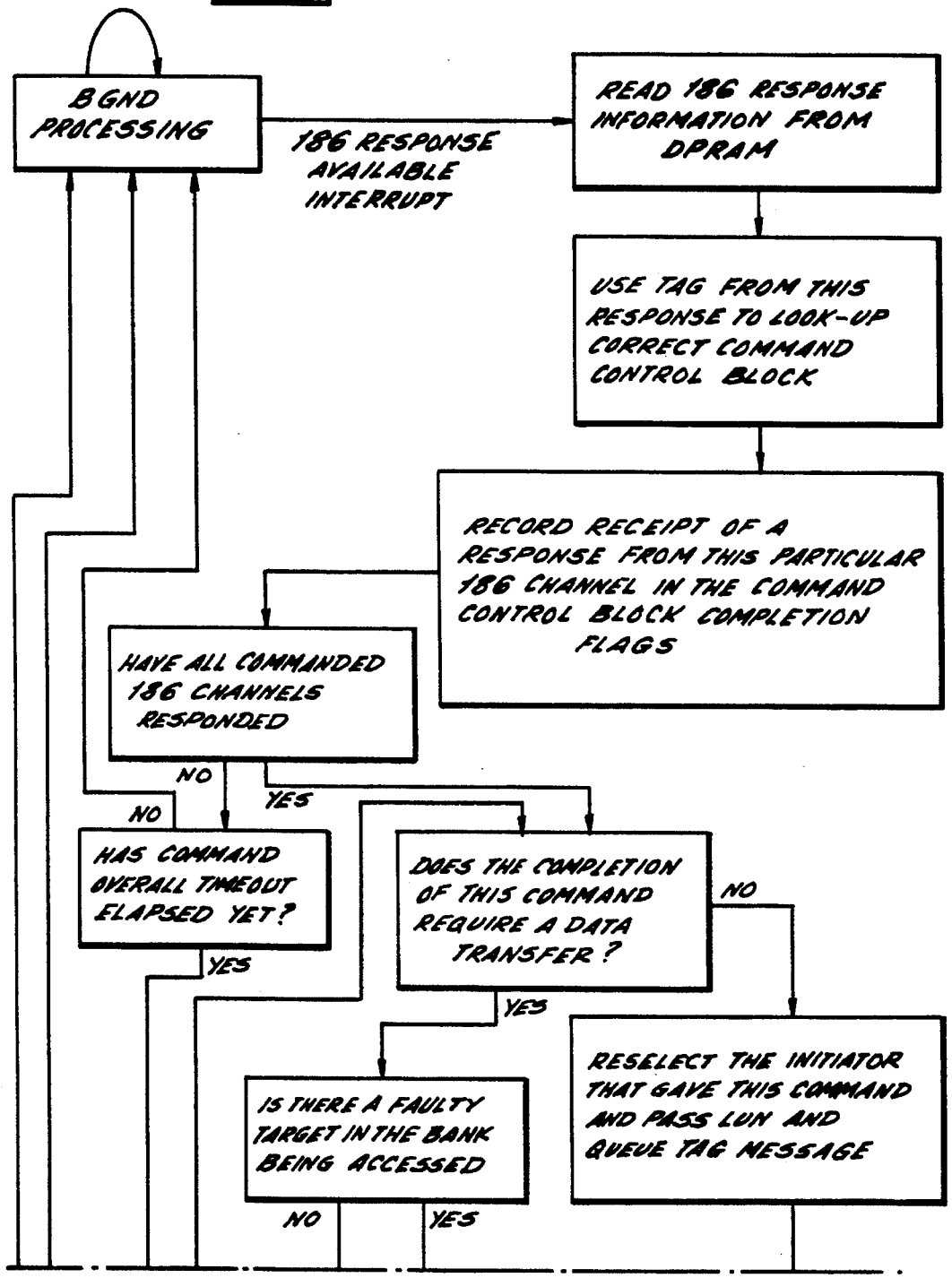
Figure 15B:
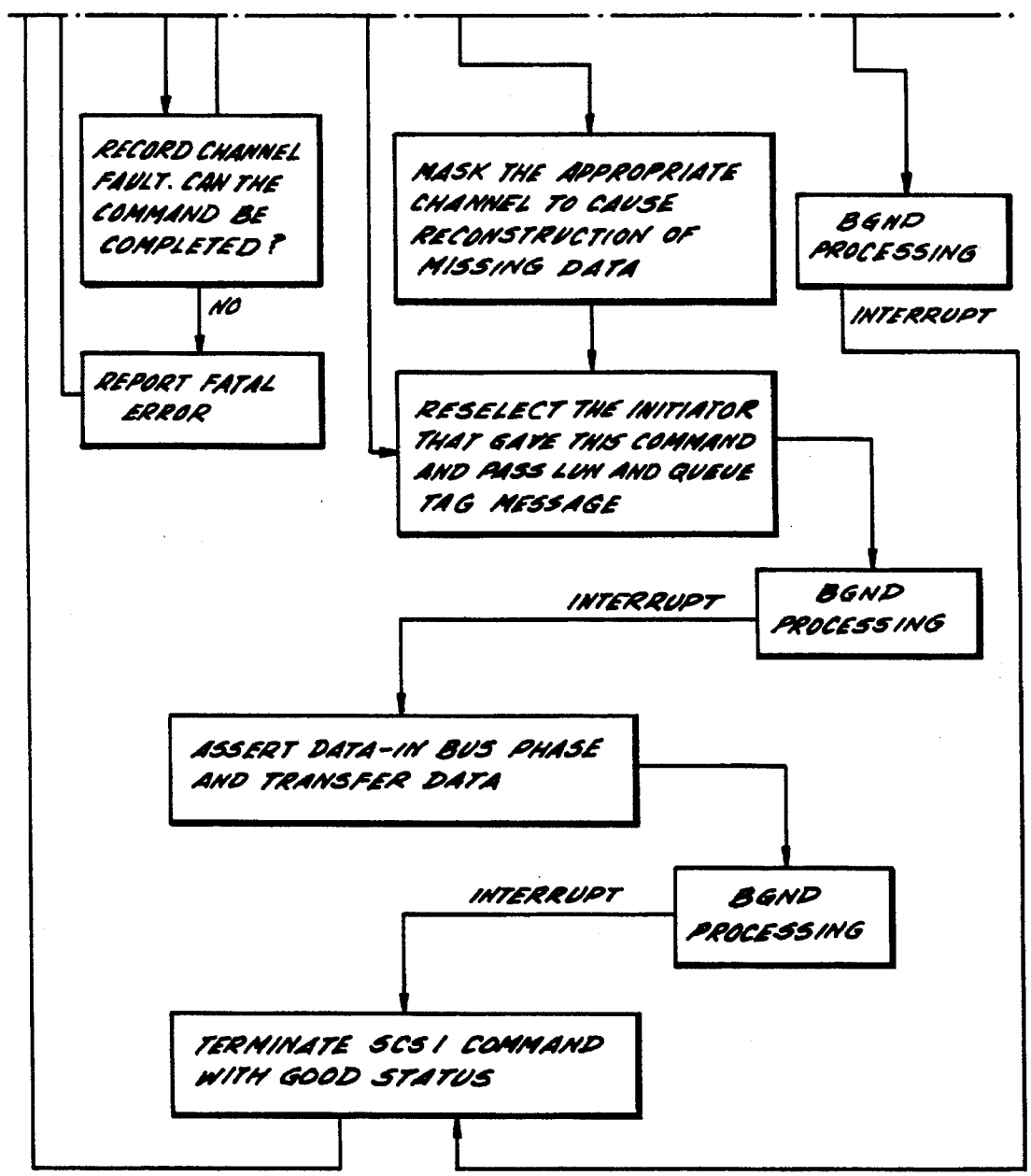

Referring now to FIG. 15, this diagram illustrates the operation of the software in the central controller when the slave bus controller responds to commands. Data can be read from the slave bus controller when the response available interrupt is generated. The response information is read from the dual port RAMs (DPRAM) and the tag from this response is used to look up the correct command control block. The receipt of a response from the particular slave bus controller is recorded in the command control block completion flags. It is then determined whether all of the slave bus controllers in the channels have responded and if not whether the command overall time-out has elapsed. If the command overall time-out has not elapsed then the central controller returns to background processing to read the channels which have not responded when they are available. If the command overall time-out has elapsed then a channel fault is recorded. It is then determined whether the command can be completed. If the command cannot be completed then a fatal error is reported and the processor returns to background processing. If the command can be completed or if all the channels have responded then it is determined whether the completion of the command requires a data transfer. If not, then the initiator that gave the command is reselected and passed the logical unit number (LUN) identity and queue tag message. The central controller then returns to background processing awaiting an interrupt whereupon it returns a good status and then returns to background processing.

If the completion of the command does require a data transfer then it is determined whether there is a faulty disk in the bank of disks being accessed. If so, then the appropriate channel is masked to cause a reconstruction of the missing data. The initiator that gave the command is reselected and passed LUN identity and queue tag message. The central processor then goes into background processing until an interrupt is received whereupon a data in bus phase is asserted and data is transferred. The central processor then returns to background processing awaiting interrupt whereupon a good status is returned.

FIGS. 16a and 16b illustrate the operation of the software by the slave bus controllers upon receipt of commands from the central controller. When the slave bus controller receives a command from the central controller, the command is read from the DPRAM. The command is decoded and syntax checked and if faulty is rejected. Otherwise, it is determined whether the command is a data read or write request. If it is not then the command is analysed to determine if a memory buffer is required and if so it is allocated. If there is no buffer space then the process is suspended to allow the reading of data to continue. The process is resumed when space is available. Then an input/output queue element is constructed and set up according to command requirements. The queue element is then put into the input/output queue and linked onto the destination targets list.

If the command is a data read or write request then it is determined which targets are to be used. The array block address is then converted to the target block address. It is then determined if the data received is to be diverted (or dumped) or a read modify write is required. If the command is a read data request then it is determined whether the transfer crosses bank boundaries. If not, then the input/output queue element is constructed and set up for the single read. If the transfer crosses bank boundaries then an input/output link block is allocated and it is recorded that two reads are to be performed for this command. If it is determined that there is no space then the process is suspended to allow the background to continue and resume when space is available. Otherwise the input/output queue element is constructed and set up to read the target and queue request. The input/output queue is also constructed and set up to read the target plus one and the request is queued. The slave bus controller then returns to background processing.

If the command is a data write request then as shown in FIG. 16b it is determined whether the transfer crosses bank boundaries. If not, it is determined whether any read modify writes are required. If so, an I/O link block is allocated or the operation suspended until space is available. I/O queue elements for each of the reads of one or two read modifying write sequences are constructed as required. An I/O queue element for the aligned part of the write is then constructed if required and the request is queued. The slave bus controller then enters background processing.

If the transfer of data does cross bank boundaries then it is determined whether the writes to the lower target requires a front read modify write. If so, the I/O queue element for the read part of the read modify write is constructed (lower target) and a request is queued. The I/O queue element for the aligned write part of the transfer is then constructed (lower target) and the request is queued. It is then determined whether the write to the higher target requires a back read modify write and if so an I/O queue element for the read part of the read modify write is constructed (higher target) and the request is queued. The I/O queue element for the aligned part of the write is then constructed (higher target) and the request queued. The slave bus controller then enters background processing.

Figure 17B:
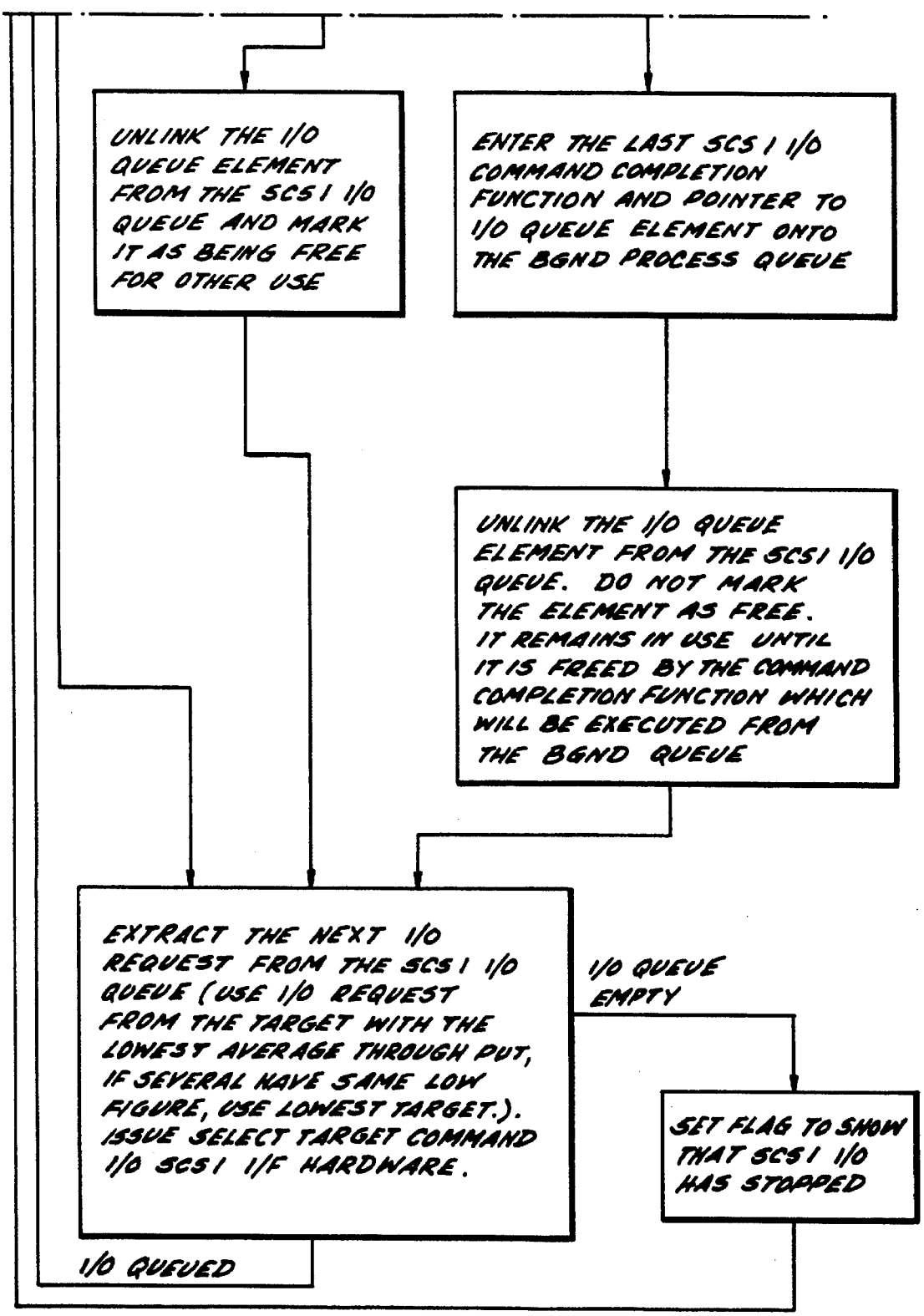

FIG. 17 illustrates the operation of the input/output handling by the slave bus controllers. The SCSI bus phases are handled to perform a required I/O for the specified target. If a target was disconnected it is determined whether the command complete message has been received. If not, a warning is generated and a target fault is logged. The SCSI I/O queue element of command just completed is examined to determine if command completion function can be executed at this current interrupt level. If so, then the last SCSI I/O command completion function is executed as specified in I/O queue element. Also the I/O queue element is unlinked from the SCSI I/O queue and is marked as being free for other uses.

If it is determined that the command completion function cannot be executed at this current interrupt level then the last SCSI I/O command completion function and pointer to I/O queue element is entered onto the background process queue. Also the I/O queue element from the SCSI I/O queue is unlinked and the element is not marked as free. It remains in use until it is freed by the command completion function which will be executed from the background queue.

The next I/O request from the SCSI I/O queue is extracted using the I/O request from the target with the lowest average throughput. If several have a low figure, the lowest target is used. A select target command is then issued to the SCSI and an I/O is queued before the processor returns to background processing. If the I/O queue is empty a flag is set to show that the SCSI I/O has stopped.

Figure 18:
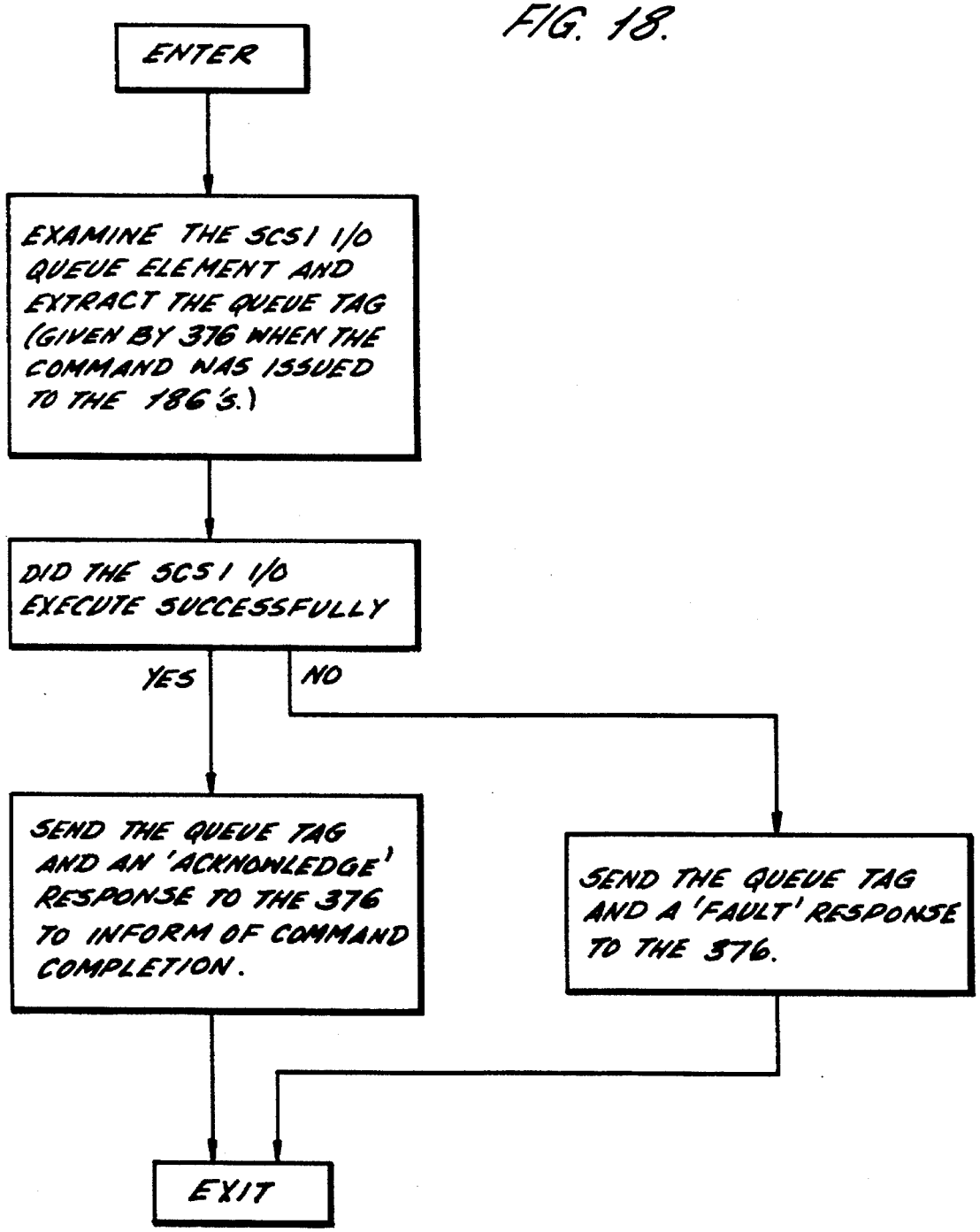

FIG. 18 illustrates a simple input/output completion function by a slave bus controller. This is executed by the SCSI I/O handler from the SCSI interrupt level. The SCSI I/O queue element is examined and the queue tag is extracted. The queue tag is given by the central controller when the command was issued to the slave bus controller. If the SCSI I/O was unsuccessfully executed then the queue tag and a fault response is sent to the central controller. If the SCSI I/O is executed successfully then the queue tag and an "acknowledge" response is sent to the central controller to inform command completion.

Figures 19, 19A, 19B:
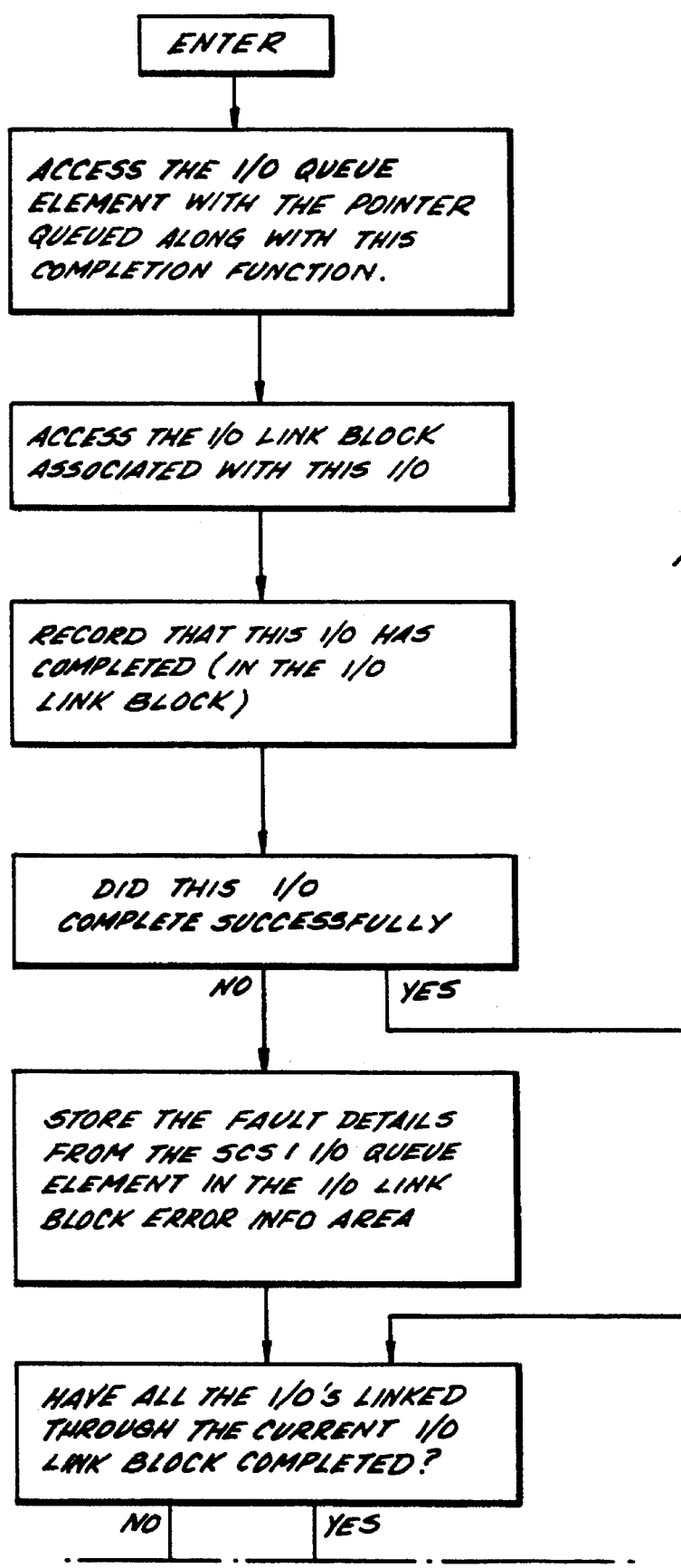
Figure 19B:
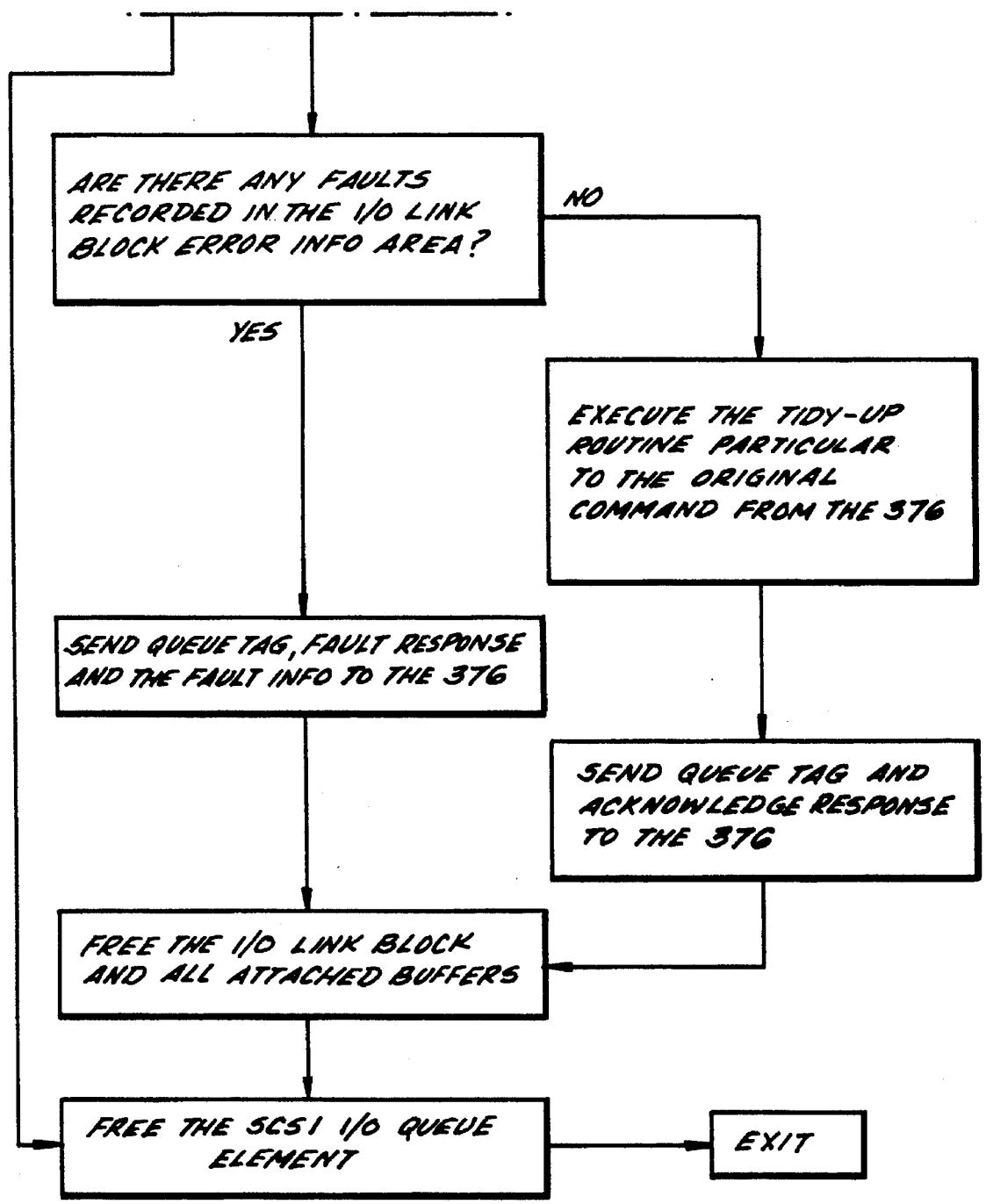

FIG. 19 illustrates the operation of a complex I/O completion function by a slave bus controller. This is executed in the background from the background queue.

The I/O queue element is accessed with the pointer queued along with the completion function. The I/O link block associated with this I/O is then accessed and in the I/O link block it is recorded that the I/O has completed. If the I/O was unsuccessfully completed then the fault details from the SCSI I/O queue element is stored in the I/O link block error information area.

It is then determined whether the I/O link through the current I/O link block has been completed. If so, it is determined whether there are any faults recorded in the I/O link block error information area. If not, a "tidy-up" routine is executed which is particular to the original command from the central controller. A queue tag and acknowledged response is then sent to the central controller.

If there are faults recorded in the I/O link block error information area then the queue tag, fault response and the fault information is sent to the central controller.

The I/O link block and all attached buffers are freed and as well as the SCSI I/O queue element.

The "tidy-up" referred to hereinabove forms the final operation of the slave bus controllers when all associated SCSI I/O has completed successfully.

Sector Translation

A problem has been experienced with the disk drives available to form the slave disk drive banks 40. As mentioned above host data arriving in "sectors" is split into four. This arrangement relies upon the slave disk drives of the array being able to be formatted with sector sizes exactly one quarter of that used by the host. A current standard sector size is 512 bytes, with a resultant slave disk sector size requirement of 128 bytes.

Until recently this has not been a problem, but due to the speed and complexity of electronics, disk drives above the 500 megabyte level can typically only be formatted to a minimum of 256 bytes per sector. Further, new disk drives above the 1 gigabyte capacity, can typically only support a minimum of 512 byte sectors. This would mean that the controller would only be able to support host sector sizes of two kilobytes.

This problem has been overcome by applying a technique termed "sector translation". In this technique each slave disk sector contains four host sectors in what is termed "virtual" slave sectors of 128 bytes. In this technique if the host requires a single sector of 512 bytes, then the controller has to extract an individual sector of 128 bytes from within the larger actual 512 bytes slave disk drive sector. When writing data, for individual writes of a single sector, or less than four correctly grouped sectors, the controller has first to read the required overall sector, then modify the data for the actual part of the sector that is necessary, and then finally write the overall slave disk sector back to the disk drive. This is a form of read modify write operation and can slow down the transfer of data to the disk drives but this is not normally a problem. Also, for large transfers of data to or from the disk drives, the affect of this problem is minimal and is not noticed by the host computer.

Three Dimensional Memory Array

The hardware shown in FIG. 1 can be expanded so that the host computer has access to a three dimensional array of disk drives. This is applicable to both RAID-35 and RAID-53 systems.

FIG. 21 illustrates an arrangement of the disk drives in three dimensions with respect to the computer memory controller 100. Each plane of disk drive corresponds to the two dimensional array illustrated in FIG. 1 (42,0.A, . . . 42,6,E). In this arrangement the number of buffer memories 26 and data splitting and parity logic 24 is increased in number to five, one for each two dimensional array (or planes) of disk drives. The central controller 22 then controls each buffer memory 26 and its associated slave controllers 32 independently. Each data splitting and parity logic 24 is connected to its associated buffer memory 26 and to the SCSI-1 interface 12

For RAID-35 operation this vastly increases the memory capacity and increases the number of read ahead segments by five, whilst for RAID-53 operation a vast increase in access speed for data is encountered since five times the number of seek operations can be carried out simultaneously compared to the two dimensional arrangement of FIG. 1.

What is described hereinabove is a schematic arrangement. In a practical arrangement five separate array controllers may be used, one per plane of disk drives.

Controller Redundancy

FIG. 22 illustrates the use of a second computer memory controller 100B. The second computer memory controller 100B is provided in case of failure of the main computer memory controller 100A. The second computer memory controller 100B is connected to each of the SCSI-1 buses at a different address to the main computer memory controller 100A. This reduces the number of banks of disk drives which can be provided to six since two of the SCSI-1 addresses are taken up by the controllers 100A and 100B.

This arrangement provides for controller redundancy where it is not acceptable to have to shut down to repair a fault.

Combined RAID-35 and RAID-53

The hardware shown in FIGS. 1, 21 and 22 can operate both RAID-35 and RAID-53. In addition the hardware can operate both systems by sharing the hardware. For instance at start-up a portion of the buffer memory 26 could be allocated to RAID-53, the remainder being allocated for RAID-35. When the system detects non sequential data requests then a buffer segment is opened in the portion of the buffer memory allocated for RAID-53 and data read thereto. If sequential data is detected by the central controller 22 then a buffer segment in the appropriate buffer portion is allocated and data read from the disk banks, together with read ahead information in the normal RAID-35 operation.

The disk banks can either be shared or a number of disk banks could be allocated for use by RAID-53 and the remainder for use by RAID-35.

This apportionment of the hardware can take place selectably by a user or it could take place automatically dependent on the sequential and non sequential data ratios. Thus for instance the system could initially be set up on RAID-53 mode upon start-up and the size of the portion of the buffer memory 26 and the number of disk banks allocated for RAID-35 will depend on the number of sequential data requests.

Overlay Bank Stripping

Overlay bank stripping is the term used hereinafter for the distribution of data amongst the memory banks and is applicable to both RAID-35 and RAID-53.

In the embodiments described hereinabove the data is stored in the banks sequentially. That is the logical blocks of user data are arranged sequentially across the disk surface and then sequentially across each additional bank. This does not fully utilise the ability of the system to read and write to banks simultaneously. If the data is better distributed over the banks of disk drives it is possible to simultaneously read and write to banks even using the RAID-35 arrangement.

The overlay bank stripping technique operates by writing data received from the host computer onto a predefined segment of the first bank. Once this segment is full the data is then written onto a segment having the same logical position in the next bank. This is repeated until the same logical segment in each bank is full whereupon data is written to the next logical segment in the first bank. This is repeated until the array is full. This process has the advantage of evenly distributing the data over the banks of the array, therefore increasing the likelihood that data required by the host computer is located on different banks which can be read simultaneously to increase the speed of data retrieval. Further, since the controller allocates addresses for each segment data can be written to different banks simultaneously to increase the speed of data storage.

Figure 23:
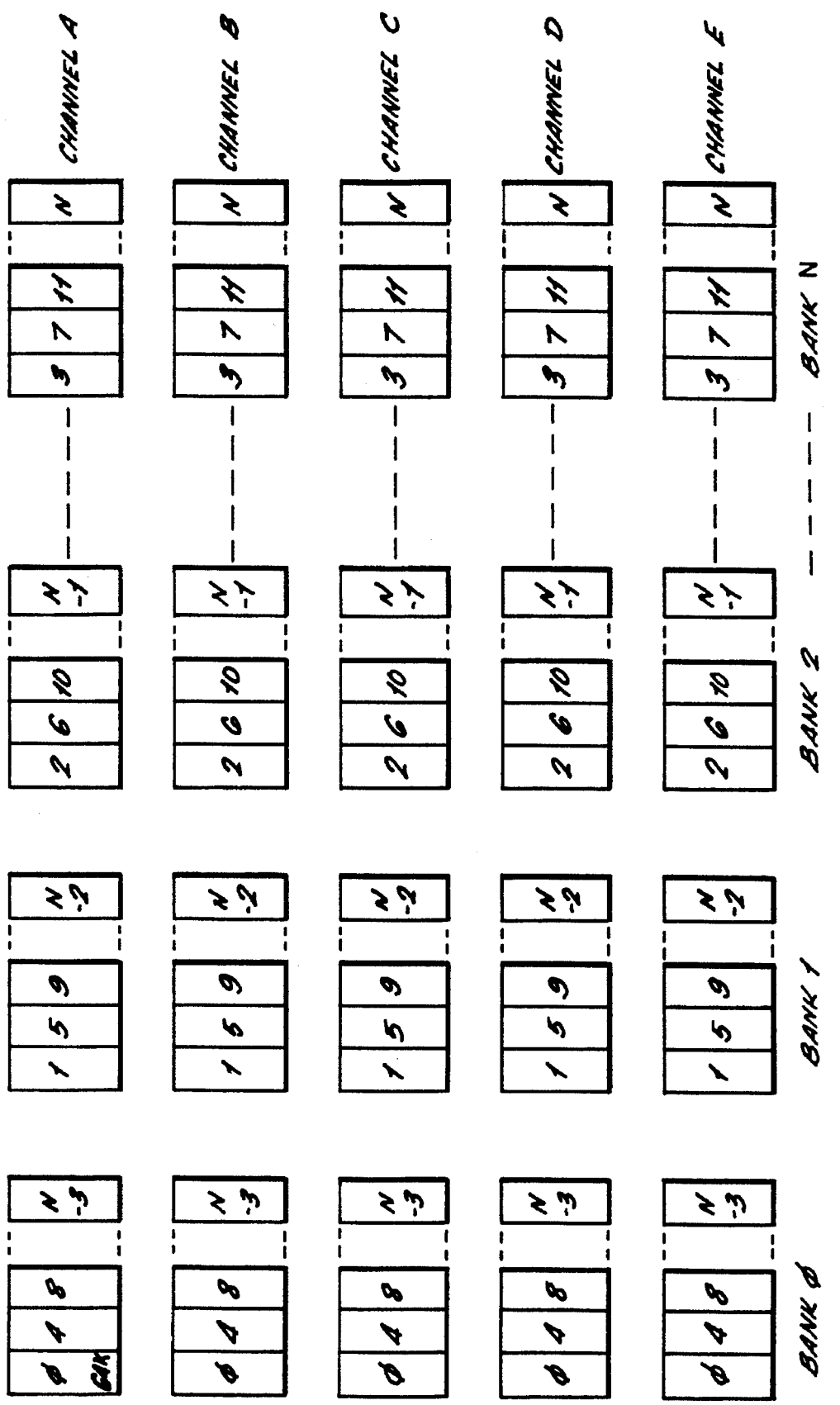
FIG. 23 illustrates the distribution of data in segments within the array using the technique of overlay bank stripping according to one embodiment of the present invention.

FIG. 23 illustrates the distribution of data in segments within the array. A segment can be defined as a data area that contains at least one block of disk data, e.g. 512 bytes, but more likely many multiples of disk data blocks, e.g. 64K bytes as shown in FIG. 23.

If a host data block is 512 bytes this is segmented using the RAID-35 or RAID-53 technique to apply 128 bytes to each channel. Thus a 64K byte segment on each disk drive of each bank can contain 512 of these host data block segments.

Although the size of the segment described hereinabove is 64K bytes, the segment size can be user selectable to allow tailoring to suit the performance optimisation required for different applications.

When overlay bank stripping is used with the RAID-53 arrangement and host data requests are truly random there is no advantage in using overlay banks stripping. However, where host data requests (read or write) appear simultaneously for data which would have previously been on the same bank (but not within the same segment), then a considerable performance improvement will be achieved since the requests are distributed across a number of bank thus allowing simultaneous read/write operations. In the arrangement shown in FIG. 23 the performance improvement is 7.

For the RAID-35 arrangement on the face of it the ability to read sequential data may be penalised using overlay bank stripping. However, the use of overlay bank stripping enhances the performance since it allows the data on different banks to be simultaneously read. Thus for sequential data greater than a segment whereas without overlay bank stripping the full length of the data is read or written to a bank, with overlay bank stripping the data can be simultaneously read from or written to one or more banks. This technique can increase the rate of data transfer to and from the array and can overcome a limitation caused by the limited access speed provided by each individual disk. If the data is distributed in a segment on each bank in the arrangement shown in FIG. 23 then the transfer rate is increased by a factor of seven. However, in order to optimise the data transfer rate provided by the SCSI interface the segment size may need to be of sufficient size, e.g. 64K bytes.

The technique of overlay bank stripping can be used with either the RAID-35 or RAID-53 techniques and where the computer memory controller is arranged to operate both by appropriately assigning the banks for the two techniques, overlay bank stripping can be used by both techniques if the disk banks are shared or only one of RAID-35 or RAID-53 if the disk banks are appropriately allocated.

From the embodiments hereinabove described it can be seen that the controller of the present invention provides for large scale sequential data transfers from memory units for multi-users of a host computer and/or random requests for small amounts of data from a multitude of users.

While the invention has been described with reference to specific elements and combinations of elements, it is envisaged that each element may be combined with other or any combination of other elements. It is not intended to limit the invention to the particular combinations of elements suggested. Furthermore, the foregoing description is not intended to suggest that any element mentioned is indispensable to the invention, or that alternatives may not be employed. What is defined as invention should not be construed as limiting the extent of the disclosure of this specification.

What is claimed is:

1. A computer memory controller for interfacing a host computer to a plurality of memory units arranged into a two-dimensional array having at least three memory channels and a plurality of memory banks, each said memory channel comprising a plurality of memory units connected by a bus and given different bus addresses such that each said memory unit of said at least three memory channels is independently accessible when addressed, and each said memory bank comprising a memory unit from each said memory channel; the computer memory controller comprising a buffer means for interfacing to said memory units and for holding data read thereto and therefrom; said buffer means being formed of a plurality of buffer segments for addressably storing data read from or written to said memory units; control means for controlling the transfer of data to and from said host computer and said memory units, said control means comprising means for allocating a buffer segment for a read or write request from the host computer, of a sufficient size for data to be read from or written to said memory units, and means for responding to read requests from said host computer to control said memory units to seek data stored in different said memory banks simultaneously and store in said buffer segments bytes or groups of bits read from said memory banks and a logic circuit connected to said buffer means to combine bytes or groups of bits read from a group of said memory units of a said memory bank and stored in said buffer segments to generate the requested data, said logic circuit including parity means operative to use a check byte or group of bits read from one of said memory units of said memory banks which is not in said group of memory units to regenerate data regenerate data read from said group of memory units if one of said group of memory units fails; said buffer means being divided into a number of channels corresponding to the number of memory channels.

2. A computer memory controller as claimed in claim 1, wherein said control means includes means to queue host data requests which said control means is unable to carry out at the time of one of said host data requests, until each memory channel containing requested data is not busy.

3. A computer memory controller as claimed in claim 2 wherein if more than one read or write request is received by said control means for one of said memory banks, said control means controls the order in which data is read or written in order to optimise the time taken to read or write the data.

4. A computer memory controller as claimed in claim 1, wherein said logic circuit includes means to split data input from said host computer into a plurality of portions such that said portions are temporarily stored in one of said buffer segments before being applied to ones of said group of memory channels for storage in one of said memory banks; and said parity means includes means to generate a check byte or group of bits from said data input from said host computer for temporary storage in one of said buffer segments before being stored in said memory unit of said memory bank which is not in said group of memory units.

5. A computer memory controller as claimed in claim 4 wherein said control means controls said buffer means to write data to one of said memory banks substantially immediately, to the detriment of any pending read or write requests.

6. A computer memory controller as claimed in claim 1, wherein said buffer means is divided into five channels for interfacing to an array of memory units having five memory channels, one of said memory channels holding said check byte or group of bits.

7. A computer memory controller as claimed in claim 1, for interfacing said host computer to said memory units arranged in a plurality of said two-dimensional arrays, the computer memory controller comprising a plurality of said buffer means, and said logic circuits, each said buffer means for interfacing to one of said two-dimensional arrays; wherein said control means controls the transfer of data to and from said host computer and a three-dimensional array of memory units formed of said plurality of said two-dimensional arrays.

8. A computer memory controller as claimed in claim 1, wherein said memory units comprise magnetic disk drives.

9. A computer memory controller as claimed in claim 1 wherein said buffer means includes means to hold data requested by said host computer and further data logically sequential thereto; said control means includinq means to control the transfer of data to said host computer in response to requests therefrom by first addressing said buffer segments to establish whether the requested data is contained therein and if so supplying said data to said host computer, and if the requested data is not contained in the buffer segments, reading said data from said memory units, supplying said data to said host computer, reading from said memory units further data which is logically sequential to the data requested by said host computer and storing said further data in one of said buffer segments; said control means including means to control the buffer means to control the number and size of said buffer segments.

10. A computer memory controller as claimed in claim 9 wherein said control means includes means to reduce the size of existing buffer segments on each occasion that a request for data from said host computer cannot be complied with from further data stored in existing ones of said buffer segments, and dynamically allocate a new segment of said buffer means for further data to the data requested, until the size of each buffer segment is some predetermined minimum, whereupon, at the next request for data not available in one of said buffer segments, the buffer segment least frequently utilised is employed.

11. A computer memory controller as claimed in claim 1 or claim 10, wherein said control means includes means to addressably segment a plurality of said memory units such that segments on sequential said memory units in one of said memory channels have a sequential address, and means to write sequential data to sequentially addressed segments on sequential segmented memory units.

12. A computer memory controller as claimed in claim 1, wherein said control means includes means to addressably segment a plurality of said memory banks into sequential bank segments on sequential memory banks such that respective segments on sequential banks have sequential addresses, and means to write sequential data to sequentially addressed bank segments on sequential segmented memory banks.

13. A method of controlling a plurality of memory units for use with a host computer wherein said memory units are arranged into a two-dimensional array having at least three memory channels and a plurality of memory banks, each said memory channel comprising a plurality of memory units connected by a bus and given different bus addresses such that each said memory unit of said at least three memory channels is independently accessible when addressed, and each said memory bank comprising a said memory unit from each said memory channel; the method comprising the steps of repeatedly receiving from said host computer read requests for data stored in said memory units and allocating a buffer segment of sufficient size for the data to be read; storing bytes or groups of bits read from a memory bank in said buffer segments in response to data requests from said host computer; recombining bytes or groups of bits read from a group of said memory units of a memory bank and stored in said buffer segments to generate the requested data; reading a check byte or group of bits from one of said memory units of said memory bank which is not in said group of memory units; regenerating data read from said group of memory units said check byte if one of said group of said memory units fails; and seeking data stored in different said memory banks simultaneously.

14. A method as claimed in claim 13, wherein said host data requests which cannot be carried out at the time of one of said host data requests, are queued to be carried out at a time when one of said memory banks containing the requested data is not busy.

15. A method as claimed in claim 14, wherein if one of said memory banks has more than one said host data request, the order in which data is sought is controlled in order to optimise the time taken to accomplish reading of the data.

16. A method as claimed in claim 13 including the steps of splitting data output from said host computer into a plurality of portions; storing said portions in one of said buffer segments; applying said split data to ones of said group of memory units of at least one of said memory banks; generating a check byte or group of bits from said data; storing said check byte or group of bits in one of said buffer segments; applying said check byte or group of bits to one said memory unit of said memory bank which is not in said group of memory units.

17. A method as claimed in claim 16, wherein data is written to one of said memory banks substantially immediately to the detriment of any pending read or write request.

18. A method as claimed in claim 13 including the steps of providing a plurality of said two-dimensional arrays of memory units to form a three-dimensional array of memory units, the method controlling the transfer of data to and from said host computer and said three-dimensional array of memory units.

19. A method as claimed in claim 13, including the steps, performed after receiving a said read request from said host computer, of checking a plurality of buffer segments to establish whether requested data is in said buffer segments, either complying with said read request by transferring data in said buffer segments to said host computer, or first reading said requested data from said memory units into one said buffer segment and then complying with said read request, reading from said memory units further data logically sequential to said requested data and storing said further data in said buffer segment.

20. A method as claimed in claim 19, further including the steps, performed after the step of checking a plurality of said buffer segements, of reducing the size of existing said buffer segments on each occasion that a request for data from said host computer cannot be complied with from said further data stored in existing ones of said buffer segments, dynamically allocating a new said buffer segment for said further data to said requested data, and continuing this process until the size of each said buffer segment is some predetermined minimum, whereupon at the next request for data not available in a said buffer segment the buffer segment least frequently utilised is employed.

21. A method as claimed in claim 13 or claim 19, including the steps of addressably segmenting a plurality of said memory units such that segments on sequential said memory units in one of said memory channels have a sequential address, and writing sequential data to sequentially addressed segments of sequential segmented memory units.

22. A method as claimed in claim 13, including the steps of addressably segmenting a plurality of said memory banks such that respective bank segments on sequential said memory banks have a sequential address, and writing sequential data to sequentially addressed bank segments of sequential segmented memory banks.

23. A computer memory controller for a host computer comprising buffer means for interfacing to at least three memory channels arranged in parallel, each said memory channel comprising a plurality of memory units connected by a bus and given different bus addresses such that each said memory unit of a memory channel is independently accessible when addressed, and a plurality of memory banks each comprising one of said memory units from each said memory channel; a logic circuit connected to said buffer means to split data input from said host computer into a plurality of portions such that said portions are temporarily stored in a buffer segment before being applied to ones of a group of said memory channels for storage in a said memory bank; said logic circuit including means to recombine portions of data successively read from successive ones of a group of said memory units of a memory bank and into said buffer means; said logic circuit including parity means for generating a check byte or group of bits from said data input from said host computer for temporary storage in said buffer means before being stored in one said memory unit of said memory bank which is not in said group of memory banks, and means to use said check byte to regenerate said data read from said group of memory units of at least one of said memory banks if one of said group of memory units fails; said buffer means being divided into a number of channels corresponding to the number of said memory channels, each said memory channel being divided into portions of buffer segments corresponding to said portions of data input from said host computer and read from said group of memory units; and control means for controlling the transfer of data and check bytes or groups of bits to and from said memory banks, including allocating one of said buffer segments for a read or a write request from the host computer of a sufficient size for data to be read or written respectively, and controlling said memory banks to seek requested data stored in different said memory banks simultaneously.

24. A computer memory controller as claimed in claim 23, wherein said control means is adapted to queue host data requests which said control means is unable to carry out at the time of one of said host data requests, until the memory bank containing requested data is not busy.

25. A computer memory controller as claimed in claim 24, wherein if more than one read or write request is received by control means for one of said memory banks, said control means controls the order in which data is read or written in order to optimise the time taken to read or write the data.

26. A computer memory controller as claimed in claim 23, wherein said control means controls said buffer means to write data to a memory bank substantially immediately, to the detriment of any pending read or write requests.

27. A computer memory controller as claimed in claim 23, wherein said buffer means is divided into five channels for interfacing to an array of memory units having five memory channels, one of said memory channels holding said check byte or group of bits.

28. A computer memory controller as claimed in claim 23 for interfacing a host computer to said memory units arranged in a plurality of said two-dimensional arrays, comprising a plurality of said buffer means, and said logic circuits, each said buffer means interfacing to one of said two-dimensional arrays; said control means controlling the transfer of data to and from said host computer and a three-dimensional array of memory units formed of said plurality of said two-dimensional arrays.

29. A computer memory controller as claimed in claim 23, wherein said memory units comprise magnetic disk drives.

30. A computer controller as claimed in claim 23, wherein said control means includes first means to allocate a first portion of said buffer means for non-sequential data, second means to allocate one of said buffer segments in said first portion for a read or write request from the host computer, which said buffer segment is of sufficient size for data to be read or written which is not sequential, means to control said memory banks to seek a plurality of requested data stored in different ones of said memory banks simultaneously, means to allocate a second portion of said buffer means for sequential data, means to control the transfer of sequential data to said host computer in response to requests therefrom by first addressing said buffer segments of the second portion to establish whether the requested data is contained therein and if so supplying said requested data to said host computer, and if the requested data is not contained in the buffer segments of said second portion, reading said requested data from the memory units of said memory banks, supplying said data to said host computer, reading from said memory units further data which is logically sequential to the data requested by the host computer and storing this further data in a said buffer segment in said second portion; said control means being further operative to control the second portion of said buffer means to control the number and size of said buffer segments.

31. A computer memory controller as claimed in claim 23, wherein said control means includes first means to allocate a first portion of said buffer means and a number of said memory banks for non-sequential data, second means to allocate one of said buffer segments in said first portion for a read or write request from the host computer which said buffer segment is of sufficient size for the data to be read or written, which is not sequential, means to control said memory banks to seek requested data stored in different ones of said number of memory banks simultaneously, third means to allocate a second portion of said buffer means and the remaining said memory banks for sequential data, means to control the transfer of sequential data to said host computer in response to requests therefrom by first addressing said buffer segments of the second portion to establish whether the requested data is contained therein and if so supplying said data to said host computer, and if the requested sequential data is not contained in the buffer segments of said second portion, reading said data from the memory units of the remaining memory banks, supplying said data to said host computer, reading from the memory units further data which is logically sequential to the data requested by the host computer and storing said further data in a buffer segment in said second portion; and means to control the second portion of said buffer means to control the number and size of said buffer segments.

32. A computer memory controller as claimed in claim 31, wherein said control means includes means to addressably segment a plurality of said memory banks such that respective bank segments on sequential memory banks have a sequential address, means to write sequential data to sequentially addressed bank segments of sequential segmented memory banks, and means to seek and read requested data as well as any data sequential thereto stored in sequential bank segments in sequential ones of said plurality of memory banks simultaneously.

33. A computer storage system comprising a plurality of memory units arranged into a two-dimensional array having at least three memory channels arranged in parallel, each said memory channel comprising a plurality of memory units connected by a bus and given a different bus address such that each said memory unit is independently accessible when addressed; a plurality of memory banks each comprising a memory unit from each said memory channel, and a controller comprising buffer means interfaced to said memory units and for holding information read from said memory channels; said buffer means being formed of a plurality of buffer segments for addressably storing data read from or written to said memory units; a logic circuit connected to said buffer means to recombine bytes or groups of bits read from ones of a group of said memory units in one of said memory banks, parity means for using a check byte or group of bits read from one of said memory units in said memory bank to regenerate information read from said group of memory units if one of said group of memory units fails; and control means for controlling the transfer of data to and from said host computer and said memory units, including allocating one of said buffer segments for a read or write request from the host computer of a sufficient size for the data to be read or written respectively, and controlling said memory banks to seek data stored in different said memory banks simultaneously.

34. A computer storage system as claimed in claim 33 comprising five memory channels arranged in parallel, one said memory channel holding said check byte or groups of bits.

35. A computer storage system as claimed in claim 33 or claim 34, wherein each memory channel comprises seven memory units thus forming seven memory banks.

36. A computer storage system as claimed in claim 33, wherein said memory units are magnetic disk drives and the rotation of magnetic disk drives of a memory bank is synchronized.

37. A computer storage system as claimed in claim 33 for interfacing a host computer to said memory units arranged in a plurality of said two-dimensional arrays, wherein said controller includes a plurality of said buffer means, said logic circuits and said parity means, each said buffer means interfacing to one of said two-dimensional arrays; said control means controlling the transfer of data to and from said host computer and a three-dimensional array of memory units formed of said plurality of said two-dimensional arrays.

38. A computer storage system as claimed in claim 33 further including a second controller interfaced to said memory channels in a like manner to said controller and having a different address on said bus.

39. A computer memory controller for a host computer comprising a plurality of buffer means each for interfacing to a plurality of memory units arranged into a two-dimensional array having at least three memory channels, each said memory channel comprising a plurality of said memory units connected by a bus and given different bus addresses such that each said memory unit is independently accessible when addressed; a plurality of memory banks each comprising a memory unit from each said memory channel; a plurality of logic circuits connected to respective said buffer means to recombine bytes or groups of bits read from ones of a group of said memory units of at least one of said memory banks and stored in said buffer segments to generate data when requested by said host computer; said logic circuits each including parity means to use a check byte or group of bits read from one of said memory units of a memory bank which is not in said group of memory units to regenerate data read from said group of memory units if one of said group of said memory units fails; said buffer means being divided into a number of channels corresponding to the number of said memory channels; each said channel being divided into portions of said buffer segments corresponding to portions of data read from said group of memory units; and control means for controlling the transfer of data from a three-dimensional array of memory units formed from a plurality of said two-dimensional arrays to said host computer in response to requests therefrom by first addressing said buffer segments to establish whether the data requested by said host computer is contained therein and if so supplying the requested data to said host computer, and if the requested data is not contained in the buffer segments, reading said requested data from the memory units, supplying said requested data to said host computer, reading from said memory units further data which is logically sequential to said requested data and storing said further data in one of said buffer segments, said control means including means responsive to data requests from said host computer to control said memory units to seek data stored in different said memory banks simultaneously; said control means further controlling said buffer means to control the number and size of said buffer segments.

* * * * *